US011943368B2

United States Patent
Novak et al.

(10) Patent No.: US 11,943,368 B2
(45) Date of Patent: Mar. 26, 2024

(54) PROVISIONING TRUSTED EXECUTION ENVIRONMENT BASED ON CHAIN OF TRUST INCLUDING PLATFORM

(71) Applicant: Microsoft Technology Licensing, LLC, Redmond, WA (US)

(72) Inventors: Mark Fishel Novak, Newcastle, WA (US); Benjamin Seth Moore, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 15/803,574

(22) Filed: Nov. 3, 2017

(65) Prior Publication Data

US 2019/0140836 A1 May 9, 2019

(51) Int. Cl.
*H04L 9/00* (2022.01)
*G06F 21/53* (2013.01)
(Continued)

(52) U.S. Cl.
CPC ............ *H04L 9/3247* (2013.01); *G06F 21/53* (2013.01); *G06F 21/74* (2013.01); *H04L 9/14* (2013.01);
(Continued)

(58) Field of Classification Search
CPC . H04L 9/3247; H04L 9/14; H04L 9/30; H04L 63/061; H04L 2209/127; G06F 21/53; G06F 21/74
See application file for complete search history.

(56) References Cited

U.S. PATENT DOCUMENTS 10,635,820 B1 * 4/2020 Gallinghouse ........ H04L 9/3247
2003/0204734 A1 10/2003 Wheeler
(Continued)

FOREIGN PATENT DOCUMENTS

| WO | 2011078855 A1 | 6/2011 |
| WO | 2015094261 A1 | 6/2015 |
| WO | 2016195880 A1 | 12/2016 |

OTHER PUBLICATIONS

"Non Final Office Action Issued in U.S. Appl. No. 15/984,053", dated Sep. 11, 2019, 22 Pages.
(Continued)

*Primary Examiner* — Daniel B Potratz
*Assistant Examiner* — Syed M Ahsan
(74) *Attorney, Agent, or Firm* — Wade IP Law PLLC

(57) ABSTRACT

Techniques are described herein that are capable of provisioning a trusted execution environment (TEE) based on (e.g., based at least in part on) a chain of trust that includes a platform on which the TEE executes. Any suitable number of TEEs may be provisioned. For instance, a chain of trust may be established from each TEE to the platform on which an operating system that launched the TEE runs. Any two or more TEEs may be launched by operating system(s) running on the same platform or by different operating systems running on respective platforms. Once the chain of trust is established for a TEE, the TEE can be provisioned with information, including but not limited to policies, secret keys, secret data, and/or secret code. Accordingly, the TEE can be customized with the information without other parties, such as a cloud provider, being able to know or manipulate the information.

28 Claims, 11 Drawing Sheets

(51) Int. Cl.
*G06F 21/74* (2013.01)
*H04L 9/14* (2006.01)
*H04L 9/30* (2006.01)
*H04L 9/32* (2006.01)
*H04L 9/40* (2022.01)

(52) U.S. Cl.
CPC .............. *H04L 9/30* (2013.01); *H04L 63/061* (2013.01); *H04L 2209/127* (2013.01)

(56) References Cited

U.S. PATENT DOCUMENTS

| | | | |
|---|---|---|---|
| 2006/0277409 A1* | 12/2006 | Galwas | G06F 21/6209 713/176 |
| 2013/0151846 A1* | 6/2013 | Baumann | H04L 9/3263 713/168 |
| 2014/0096182 A1* | 4/2014 | Smith | H04L 63/0853 726/1 |
| 2015/0271208 A1* | 9/2015 | Gallant | H04L 9/3247 726/1 |
| 2015/0319160 A1* | 11/2015 | Ferguson | H04W 12/10 726/10 |
| 2015/0347768 A1 | 12/2015 | Martin et al. | |
| 2016/0036826 A1 | 2/2016 | Pogorelik et al. | |
| 2016/0350534 A1* | 12/2016 | Poornachandran | H04L 9/3273 |
| 2017/0230179 A1 | 8/2017 | Mannan et al. | |
| 2017/0295018 A1* | 10/2017 | Whitehouse | H04L 63/045 |
| 2018/0139044 A1 | 5/2018 | Lange | |
| 2018/0225661 A1 | 8/2018 | Russinovich et al. | |
| 2018/0287802 A1* | 10/2018 | Brickell | H04L 9/14 |
| 2019/0140846 A1 | 5/2019 | Moore et al. | |
| 2019/0349733 A1 | 11/2019 | Nolan et al. | |

OTHER PUBLICATIONS

"Final Office Action Issued in U.S. Appl. No. 15/984,053", dated Apr. 6, 2020, 22 Pages.
"Non Final Office Action Issued in U.S. Appl. No. 15/984,053", dated Nov. 25, 2020, 25 Pages.
"Non Final Office Action Issued in U.S. Appl. No. 15/984,053", dated May 19, 2021, 21 Pages.
Arthur, et al., "Platform Configuration Registers", In Book of a Practical Guide to TPM 2.0, Jan. 23, 2015, 375 Pages.
"Final Office Action Issued in U.S. Appl. No. 15/984,053", dated Nov. 22, 2021, 35 Pages.
"Office Action Issued in European Patent Application No. 18804459.8", dated Feb. 15, 2022, 8 Pages.
"Notice of Allowance Issued in European Patent Application No. 18801200.9", dated Mar. 17, 2022, 2 Pages.
"Non Final Office Action Issued in U.S. Appl. No. 15/984,053", dated Aug. 29, 2022, 40 Pages.
"Final Office Action Issued in U.S. Appl. No. 15/984,053", dated Jun. 15, 2023, 38 Pages.
"International Search Report and Written Opinion Issued in PCT Application No. PCT/US18/057905", dated Feb. 11, 2019, 09 Pages.
"International Search Report and Written Opinion Issued in PCT Application No. PCT/US2018/057901", dated Feb. 11, 2019, 11 Pages.
"Notice of Allowance Received for European Patent Application No. 18804459.8", dated Oct. 26, 2023, 8 Pages.
"Notice of Allowance Issued in U.S. Appl. No. 15/984,053," dated Jan. 10, 2024, 20 pages.

* cited by examiner

PROVISIONING TRUSTED EXECUTION ENVIRONMENT BASED ON CHAIN OF TRUST INCLUDING PLATFORM

BACKGROUND

Data breaches in distributed computing systems (e.g., public or private clouds) are increasingly common, with attackers often gaining access to personally identifiable information (PII), financial data, and corporate intellectual property. While some data breaches result from poorly configured access control, many data breaches result from data being accessed while the data is in use (e.g., through administrative accounts or by leveraging compromised keys to access encrypted data). Despite advanced cybersecurity controls and mitigations, some entities are reluctant to move their data to a distributed computing system for fear of attacks against their data when the data is in use.

"Confidential computing" is one example technique that has been proposed for providing greater protection of data in distributed computing systems. For instance, a goal of confidential computing is to protect data while the data is in use. However, confidential computing solutions traditionally are not secure end-to-end. For instance, when conventional confidential computing solutions are employed, the secrets for protecting data typically are potentially knowable by a cloud provider, and the code is not confidential. Accordingly, the cloud provider may be cryptographically compelled to disclose the data and/or code that the confidential computing solution is employed to protect.

SUMMARY

Various approaches are described herein for, among other things, provisioning a trusted execution environment (TEE) based on (e.g., based at least in part on) a chain of trust that includes a platform on which the TEE executes. Any suitable number (e.g., 1, 2, 3, or 4) of TEEs may be provisioned. For instance, a chain of trust may be established from each TEE to the platform on which an operating system that launched the TEE runs. Any two or more TEEs may be launched by operating system(s) running on the same platform or by different operating systems running on respective platforms. Once the chain of trust is established for a TEE, the TEE can be provisioned with information, including but not limited to policies, secret keys, secret data, and/or secret code. Accordingly, the TEE can be customized with the information without other parties, such as a cloud provider, being able to know or manipulate the information.

In a first example approach, a client device (e.g., owned or operated by a customer of a cloud service) establishes a chain of trust from a TEE to a platform based at least in part on receipt of measurements of the TEE that are gathered by the platform and that are signed with a platform signing key of the platform. The measurements indicate attributes of the TEE. The TEE is hosted by a distributed computing system that is coupled to the client device (e.g., and that provides the cloud service). The platform is configured to execute an operating system. The operating system is configured to launch the TEE from a template. The client device provisions the TEE with information in absence of a secure channel between the client device and the TEE to customize the TEE with the information based at least in part on the chain of trust.

In a second example approach, a first TEE (e.g., the TEE mentioned in the first example approach described above) establishes a chain of trust from a second TEE to a platform based at least in part on receipt of measurements of the second TEE that are gathered by the platform and that are signed with a platform signing key of the platform. The measurements indicate attributes of the second TEE, which is hosted by a distributed computing system that hosts the first TEE. The platform is configured to execute an operating system. The operating system is configured to launch the second TEE from a template. The first TEE provisions the second TEE with information in absence of a secure channel between the first TEE and the second TEE to customize the second TEE with the information based at least in part on the chain of trust.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
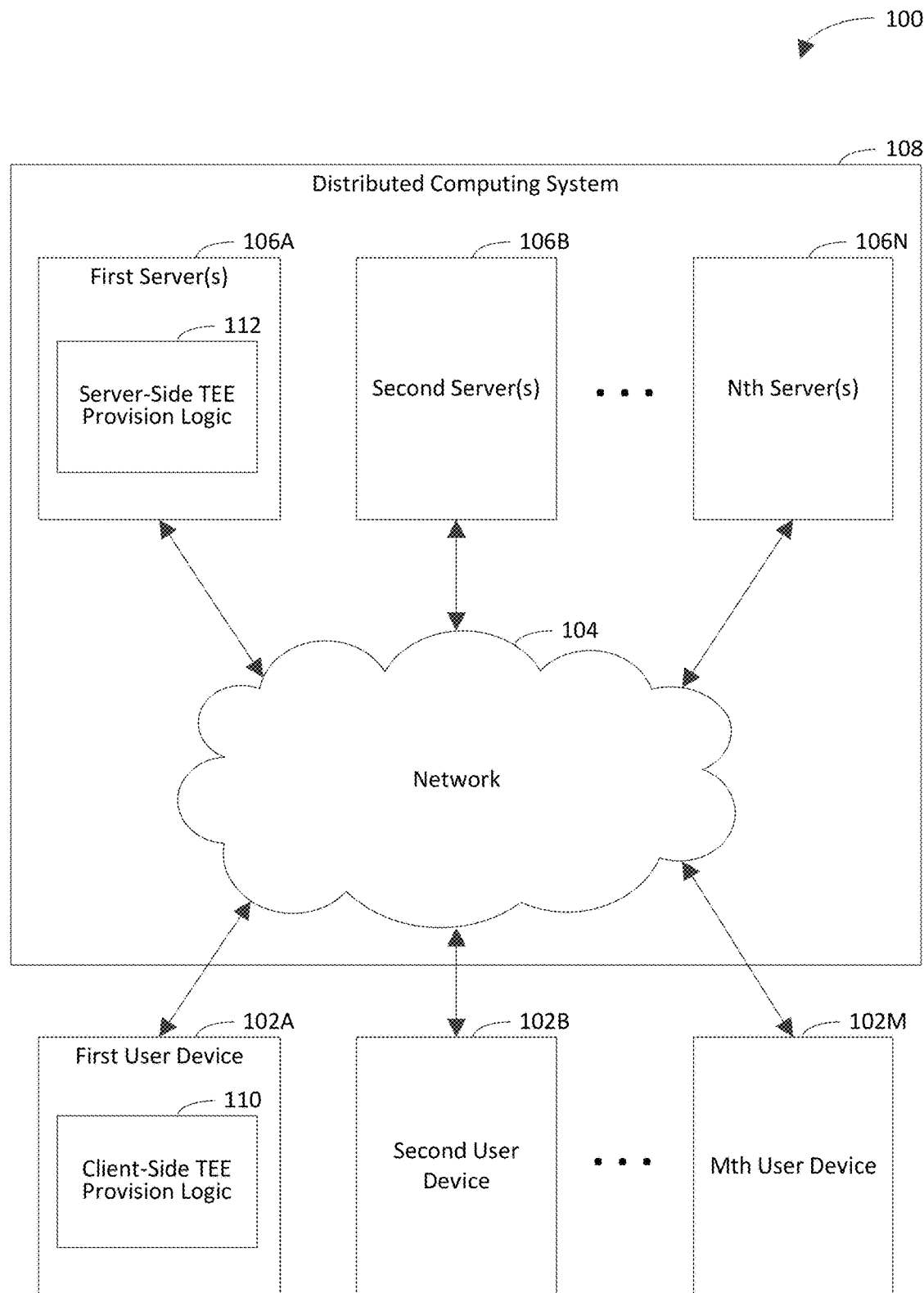
FIGS. 1 and 3-5 are block diagrams of example trusted execution environment (TEE) provisioning systems in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

II. Example Embodiments

Example embodiments described herein are capable of provisioning a trusted execution environment (TEE) based on (e.g., based at least in part on) a chain of trust that includes a platform on which the TEE executes. A TEE is a secure area associated with a platform in a computing system. For example, a TEE may ensure that sensitive data is stored, processed, and protected in an isolated, trusted environment. In another example, a TEE may provide isolated, safe execution of authorized software. Accordingly, a TEE may provide end-to-end security by enforcing protected execution of authenticated code, confidentiality, authenticity, privacy, system integrity, and data access rights.

Any suitable number (e.g., 1, 2, 3, or 4) of TEEs may be provisioned. A chain of trust may be established from each TEE to the platform on which an operating system that launched the TEE runs. For example, a client device may establish a first chain of trust from a first TEE to a platform on which an operating system that launched the first TEE runs; the first TEE may establish a second chain of trust from a second TEE to a platform on which an operating system that launched the second TEE runs; the second TEE may establish a third chain of trust from a third TEE to a platform on which an operating system that launched the third TEE runs, and so on. Any two or more TEEs may be launched by the same operating system or different operating systems running on the same platform or by different operating systems running on respective platforms. Once the chain of trust is established for a TEE, the TEE can be provisioned with information, including but not limited to policies, secret keys, secret data, and/or secret code. Accordingly, the TEE can be customized with the information without other parties, such as a cloud provider, being able to know or manipulate the information. In accordance with the aforementioned example, the client device may provision the first TEE with first information; the first TEE may provision the second TEE with second information; the second TEE may provision the third TEE with third information, and so on. It will be recognized that the first, second, and third information may be the same or different.

Example techniques described herein have a variety of benefits as compared to conventional techniques for provisioning TEEs. For instance, the example techniques may be capable of increasing security of a distributed computing system. For instance, example techniques may increase security of TEE(s) in the distributed computing system and information with which the TEE(s) are provisioned. The example techniques may be capable of provisioning a TEE with any suitable information (e.g., a customer's policies, keys, data, and/or code) in an untrusted environment (e.g., in view of an untrusted cloud service or a malicious attacker) based on (e.g., based at least in part on) trust in a platform on which an operating system that launches the TEE runs. The TEE may be customized with the information without other entities (e.g., a provider of the cloud service or the malicious attacker) being able to know or manipulate the information.

The example embodiments may provide "opaque computing." Opaque computing is a superset of "confidential computing" that conceals sensitive code and data from a cloud provider. "Confidential computing" provides encryption of data when the data is at rest and while the data is in use. Accordingly, by employing confidential computing, the data can be processed in a distributed computing system (e.g., a public or private cloud) with assurance that the data remains under customer control. By employing opaque computing, the cloud provider may charge customers for compute time, data storage, and network traffic, but the cloud provider has no access to plaintext of the code or data no matter where in the distributed computing system such code or data are stored. The goal of opaque computing is achieved when the cloud provider cannot be cryptographically compelled to disclose customers' code and data. Accordingly, confidential computing shields sensitive bits from a single machine, and opaque computing extends this paradigm to the entire distributed computing system and all the services that are offered by the distributed computing system to a customer.

The example techniques may enable a customer of a cloud service to run publicly available code (e.g., open source code) in secret (e.g., in presence of a hostile cloud operator) and have the code enforce the customer's rules and policies. The example techniques may enable multiple customers of a cloud service to operate respective TEEs side-by-side on a common platform, and each customer may be unable to know or manipulate information with which the other customers' TEEs are provisioned.

The example techniques may be capable of utilizing consensus algorithms (e.g., without modification) to establish chains of trust from TEEs to their platforms and to provision the TEEs with information to customize the TEEs in a distributed computing system. A consensus algorithm may utilize the same trust mechanism to establish trust in each successive TEE. The set of communications that is used to establish a chain of trust from a first TEE to its platform and to provision the first TEE may be the same as the set of communications that is used to establish a chain of trust from a second TEE to its platform and to provision the second TEE, which may be the same as the set of communications that is used to establish a chain of trust from a third TEE to its platform and to provision the third TEE, and so on.

FIG. 1 is a block diagram of an example trusted execution environment (TEE) provisioning system 100 in accordance with an embodiment. Generally speaking, TEE provisioning system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, TEE provisioning system 100 provisions a TEE based on a chain of trust that includes a platform on which the TEE executes. Detail regarding techniques for provisioning a TEE based on a chain of trust that includes a platform on which the TEE executes is provided in the following discussion.

As shown in FIG. 1, TEE provisioning system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof. Servers 106A-106N and network 104 are shown to be included in a distributed computing system 108 (e.g., a public cloud or a private cloud).

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 106A-106N, so that user systems 102A-102M may access information that is available via the domains. Such domains may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user systems 102A-102M may communicate with any one or more servers 106A-106N.

First user device 102A is shown to include client-side TEE provision logic 110 for illustrative purposes. Client-side TEE provision logic 110 is configured to perform client-side aspects of the example techniques described herein. For instance, client-side TEE provision logic 110 may establish a chain of trust from a TEE to a platform based at least in part on receipt of measurements of the TEE that are gathered by the platform and that are signed with a platform signing key of the platform. The measurements indicate attributes of the TEE. The TEE is hosted by distributed computing system 108. For instance, the TEE may be hosted by any of servers 106A-106N. The platform is configured to execute an operating system. The operating system is configured to launch the TEE from a template. Client-side TEE provision logic 110 may provision the TEE with information in absence of a secure channel between the client device and the TEE to customize the TEE with the information based at least in part on the chain of trust.

Servers 106A-106N are processing systems that are capable of communicating with user systems 102A-102M. Servers 106A-106N are configured to execute computer programs that provide information to user devices 102A-102M. For instance, servers 106A-106N may push such information to user devices 102A-102M or provide the information in response to requests that are received from user devices 102A-102M. The requests may be user-generated or generated without user involvement. For example, policies that are applied to a user device are done without explicit user requests. In accordance with this example, the policies are applied in the background even if no user is logged onto the user device. In further accordance with this example, the user device (e.g., an agent thereon) may poll a server for policy on a schedule (e.g., once per hour) or on events (e.g., device wakeup, user unlock, etc.). In further accordance with this example, the server may push the policy to the user device (e.g., an agent thereon) via an open HTTP endpoint. The information provided by servers 106A-106N may include documents (e.g., Web pages, images, audio files, video files, etc.), output of executables, or any other suitable type of information. In accordance with some example embodiments, servers 106A-106N are configured to host respective Web sites, so that the Web sites are accessible to users of TEE provisioning system 100.

First server(s) 106A is shown to include server-side TEE provision logic 112 for illustrative purposes. Server-side TEE provision logic 112 is configured to perform server-side aspects of the example techniques described herein. For instance, server-side TEE provision logic 112 may include a first TEE (e.g., the TEE provisioned by client-side TEE provision logic 110, as described above) that establishes a chain of trust from a second TEE to a platform based at least in part on receipt of measurements of the second TEE that are gathered by the platform and that are signed with a platform signing key of the platform. The measurements indicate attributes of the second TEE. The first and second TEEs are hosted by distributed computing system 108. The platform is configured to execute an operating system. The operating system is configured to launch the second TEE from a template. The platform associated with the second TEE and a platform associated with the first TEE may be the same or different. The first TEE provisions the second TEE with information in absence of a secure channel between the first TEE and the second TEE to customize the second TEE with the information based at least in part on the chain of trust.

Each of client-side TEE provision logic 110 and server-side TEE provision logic 112 may be implemented in various ways to provision a TEE based on a chain of trust that includes a platform on which the TEE executes, including being implemented in hardware, software, firmware, or any combination thereof. For example, each of client-side TEE provision logic 110 and server-side TEE provision logic 112 may be implemented as computer program code configured to be executed in one or more processors. In another example, each of client-side TEE provision logic 110 and server-side TEE provision logic 112 may be at least partially implemented as hardware logic/electrical circuitry. For instance, each of client-side TEE provision logic 110 and server-side TEE provision logic 112 may be at least partially implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Client-side TEE provision logic 110 is shown to be incorporated in first user device 102A for illustrative purposes and is not intended to be limiting. It will be recognized that client-side TEE provision logic 110 may be incorporated in any of the user systems 102A-102M. Server-side TEE provision logic 112 is shown to be incorporated in first server(s) 106A for illustrative purposes and is not intended to be limiting. It will be recognized that server-side TEE provision logic 112 may be incorporated in any one or more of the servers 106A-106N.

Figure 2:
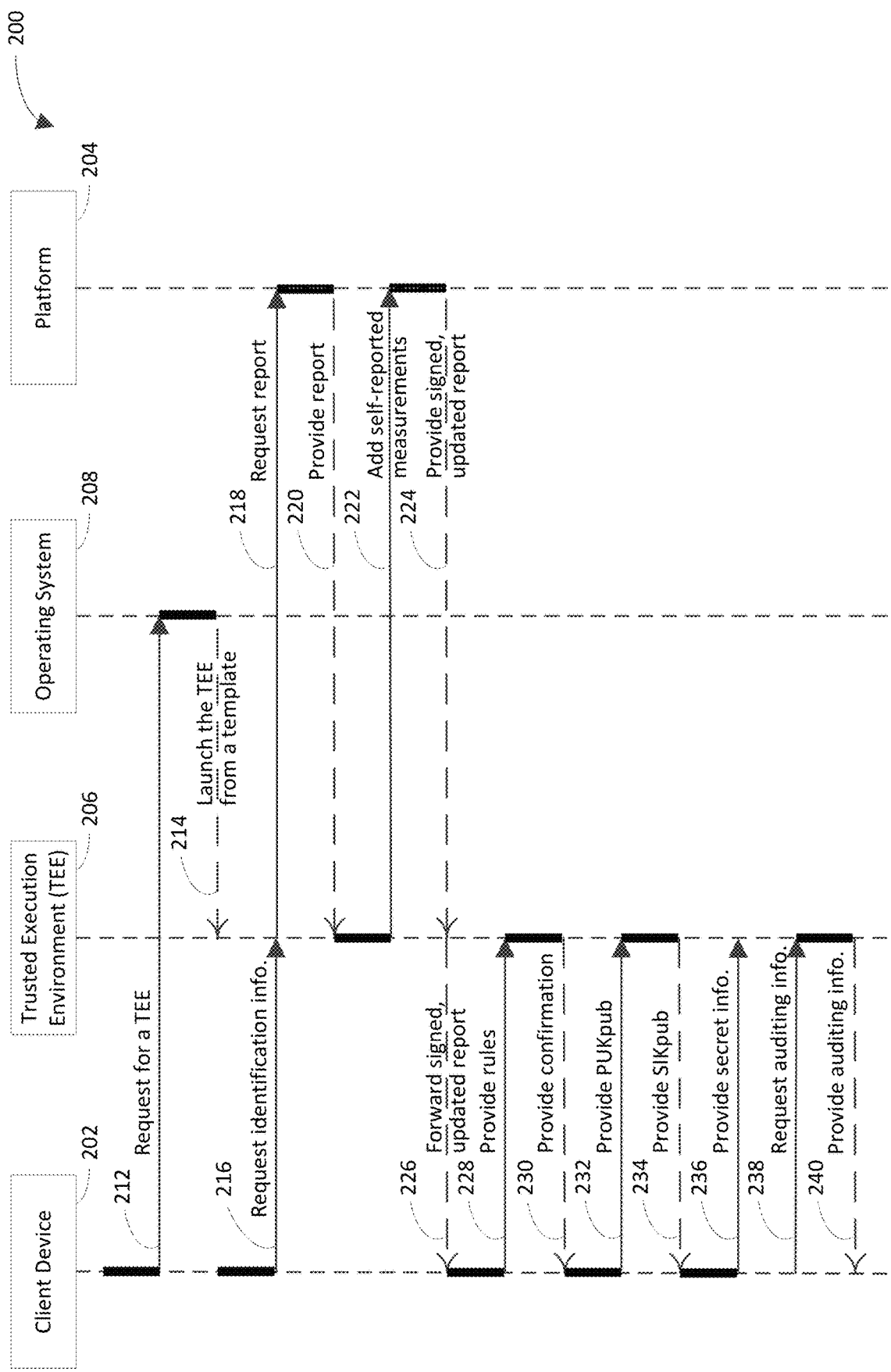
FIG. 2 is an example activity diagram in accordance with an embodiment.

FIG. 2 is an example activity diagram 200 in accordance with an embodiment. FIG. 2 depicts a client device 202, a platform 204, a trusted execution environment (TEE) 206, and an operating system 208. Activities 212, 214, 216, 218, 220, 222, 224, 226, 228, 230, 232, 234, 236, 238, and 240 will now be described with reference to client device 202, platform 204, TEE 206, and operating system 208.

In activity 212, client device 202 generates a request for a TEE. For example, client device 202 may be owned or controlled by a customer of a cloud service. Client device 202 may generate the request based on instructions that are received from the customer. The instructions from the customer may indicate that the customer wishes to set up a web service, attestation service, database, machine learning system, etc. Client device 202 may generate the request for the TEE for purposes of setting up the web service, attestation service, database, machine learning system, etc.

In activity 214, operating system 208, which runs on platform 204, launches the TEE from a template. The template is executable code. For instance, the template may be a piece of executable code that has not been customized with regard to a client device or customer associated therewith. The template represents a known starting point for customizing the TEE. Accordingly, the template may include nothing that is customer-specific. For instance, the template may not include any customer secrets (e.g., secret keys, code, and/or data of the customer). In one example, the template may have been previously received from client device 202. For instance, the customer may have commissioned a developer to create the template. In another example, the template may have been selected by the customer from a gallery that is provided by the cloud service.

In an example embodiment, the TEE is an enclave, and the platform is a central processing unit (CPU). In one aspect of this embodiment, the enclave may run on a virtual machine, and the virtual machine may run on the CPU. In another aspect of this embodiment, the enclave may run on a virtual machine; the virtual machine may run on a host operating system (e.g., operating system 208); and the host operating system may run on the CPU. The level of nesting is arbitrary. In another embodiment, a blind hypervisor is used, in which case the virtual machine is the TEE.

In activity 216, client device 202 requests identification information that identifies TEE 206. It should be noted that the request is shown in FIG. 2 to be sent directly from client device 202 to TEE 206 for purposes of illustration and is not intended to be limiting. For instance, the request may be sent from client device 202 to software running on platform 204, and the software may forward the request to TEE 206. In accordance with this example, the software may provide message-passing facilities between client device 202 and TEE 206.

In activity 218, TEE 206 requests a report that includes the identification information from platform 204. For instance, the request may be a GET REPORT request as will be understood by persons skilled in the relevant art.

In activity 220, platform 204 provides the report to TEE 206. The report includes measurements of TEE 206. The measurements include the identification information. For instance, the measurements may indicate unforgeable attributes of TEE 206 (e.g., an author, publisher, security version number, code type, and/or compilation date of TEE 206 and/or a key used to sign the measurements of TEE 206). It will be recognized that asymmetric and/or symmetric authentication techniques may be used to authenticate the measurements. For example, platform 204 may sign the measurements with a platform signing key (PSK) before providing the measurements to TEE 206. In another example, one or more symmetric key-based message authentication codes (MACs) may be used as proof-of-authenticity of a report. Examples of a symmetric key-based MAC include but are not limited to keyed-hash MAC (HMAC) and cipher-based MAC (CMAC).

In activity 222, TEE 206 adds self-reported measurements to the report, resulting in an updated report. The self-reported measurements are measurements that TEE 206 gathers or generates about itself. For instance, the self-reported measurements may be a hash (e.g., having a fixed length value) of a structure that includes any of a variety of keys, policies, or other suitable information. In activity 222, TEE 206 may further request that platform 204 sign the updated report.

In activity 224, platform 204 signs the updated report with the PSK and provides the signed, updated report to TEE 206.

In activity 226, TEE 206 forwards the signed, updated report to client device 202.

In activity 228, client device 202 provides rules (a.k.a. policies) for TEE 206 to enforce. For instance, the rules may specify conditions under which TEE 206 is to apply a signature to information, a rule for updating rules, or keys of customers that are to connect to TEE 206.

In activity 230, TEE 206 provides confirmation that the rules have been received from client device 202. For example, TEE 206 may provide cryptographic proof that the rules have been received. The cloud provider must not be able to manipulate the cryptographic proof. In another example, TEE 206 may provide the confirmation by repeating the rules back to client device 202 as part of a report that is signed by the platform.

In activity 232, client device 202 provides a public portion of a policy update key (i.e., PUKpub) to TEE 206. The PUKpub may correspond to a private portion of the policy update key (i.e., PUKpri) that client device 202 intends to use to sign subsequent (e.g., updated) rules that are to be sent to TEE 206. For instance, the PUKpub may be used by TEE 206 to verify that the subsequent rules are provided by client device 202. It may be said that activity 232 personalizes TEE 206 so that client device 202 need not kill TEE 206 and request another TEE to implement the subsequent rules.

In activity 234, TEE 206 provides a public portion of a secret import key (i.e., SIKpub) to client device 202, so that client device 202 may use the SIKpub to encrypt secret information (e.g., keys, data, and/or code) that is to be sent to TEE 206. The SIKpub corresponds to a private portion of the secret import key (i.e., SIKpri) that is usable by TEE 206 to decrypt the secret information. The secret information is capable of being decrypted only by TEE 206 because TEE 206 is the only entity in possession of the SIKpri.

In activity 236, client device 202 provides the secret information, which is encrypted with the SIKpub, to TEE 206.

In activity 238, client device 202 requests auditing information from TEE 206 (e.g., to determine whether TEE 206 is operating as expected).

In activity 240, TEE 206 provides the auditing information to client device 202.

Any one or more of activities 216, 218, 220, 222, 224, and/or 226 may be used to establish a chain of trust from TEE 206 to platform 204. Any one or more of activities 228, 230, 232, 234, and/or 236 may be used to provision TEE 206 with information for purposes of customizing TEE 206 with the information. For example, any of activities 228, 230, and/or 232 may be used to provision TEE 206 with rules. In another example, any of activities 234 and/or 236 may be used to provision TEE 206 with secret information.

In some example embodiments, one or more activities 212, 214, 216, 218, 220, 222, 224, 226, 228, 230, 232, 234, 236, 238, and/or 240 of activity diagram 200 may not be performed. Moreover, activities in addition to or in lieu of activities 212, 214, 216, 218, 220, 222, 224, 226, 228, 230, 232, 234, 236, 238, and/or 240 may be performed. It will be recognized that some activities may be combined. For example, client device 202 may combine activities 228 and 232. In another example, TEE 206 may combine activities 226 and 234. In accordance with this example, TEE 206 may include SIKpub in the signed, updated report.

Figure 3:
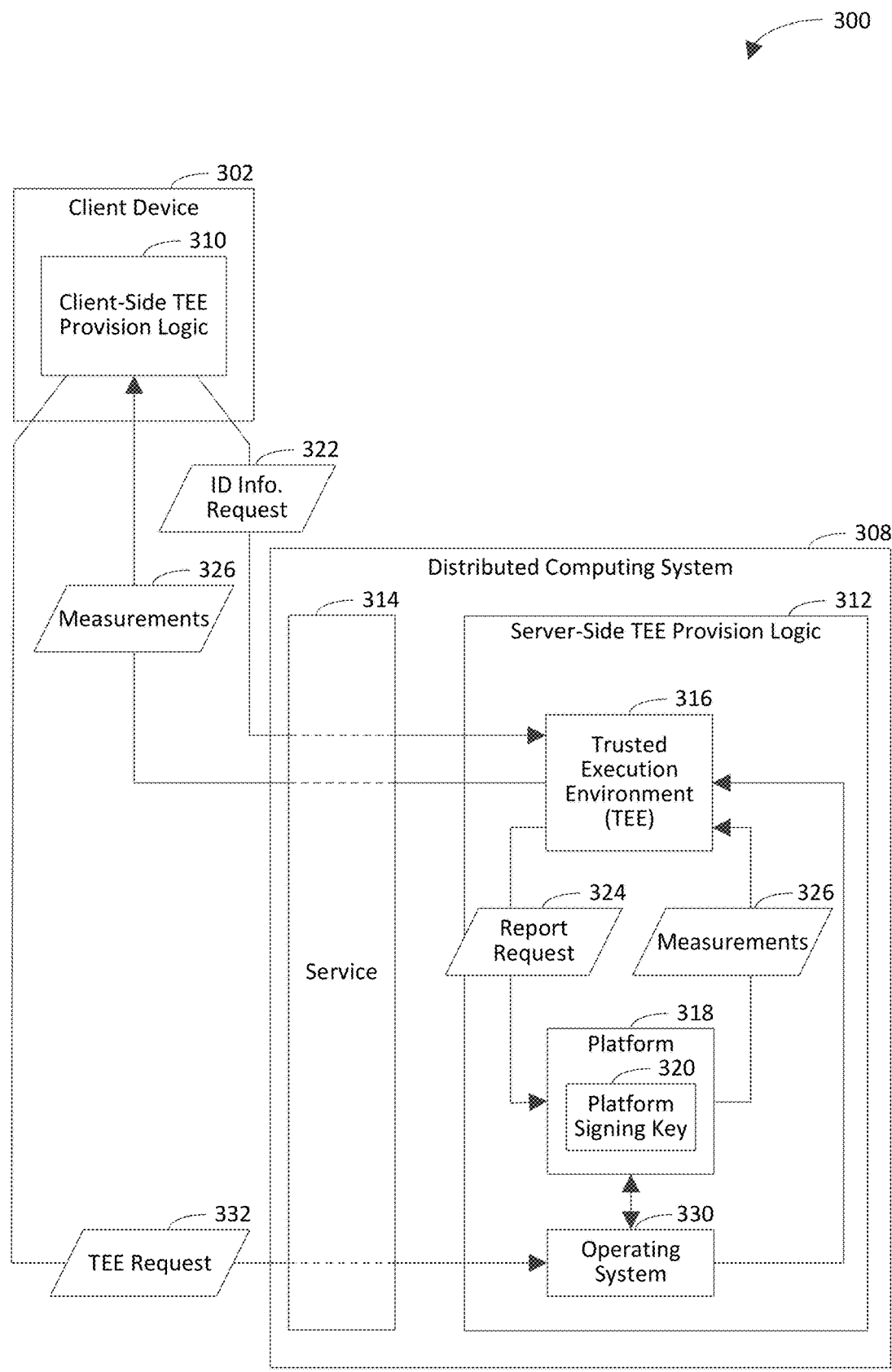

FIG. 3 is a block diagram of an example trusted execution environment (TEE) provisioning system 300 in accordance with an embodiment. As shown in FIG. 3, TEE provisioning system 300 includes a client device 302 and a distributed computing system 308. Client device 302 is an example implementation of first user device 102A shown in FIG. 1. Client device 302 may perform any one or more of the activities performed by client device 202 of FIG. 2. Client device 302 includes client-side TEE provision logic 310, which is operable in a manner similar to client-side TEE provision logic 110 shown in FIG. 1. Client-side TEE provision logic 310 generates a TEE request 332 in response to (e.g., based on) instructions that are received from a user associated with client device 302. The TEE request 332 requests for a trusted execution environment (TEE) 316 to be created. Client-side TEE provision logic 310 provides the TEE request to an operating system 330. Client-side TEE provision logic 310 then generates an identification (ID) information request 322. The ID information request 322 requests identifying information that identifies TEE 316. Client-side TEE provision logic 310 provides the ID information request 322 to TEE 316

Client-side TEE provision logic 310 receives measurements 326, which are signed with a platform signing key 320, from distributed computing system 308 in response to providing the ID information request 322. The measurements 326 include the identifying information, which is specified by the ID information request 322. Client-side TEE provision logic 310 verifies that the measurements 326 are received from TEE 316 based on the measurements 326 being signed with the platform signing key 318. For instance, client-side TEE provision logic 310 may use a public key that corresponds to the platform signing key 320 to verify that the measurements 326 are received from TEE 316. The public key may be received from a manufacturer of platform 318. For instance, client device 302 may download the public key from a website of the manufacturer (e.g., based on a user of client device 302 selecting a hyperlink associated with the public key on the website).

Distributed computing system 308 includes a service 314 and server-side TEE provision logic 312. Service 314 hosts a platform 318 on which TEE 316 executes. Service 314 may utilize web technology, such as Hypertext Transfer Protocol (HTTP), for machine-to-machine communication. For instance, service 314 may transfer machine-readable file formats, such as Extensible Markup Language (XML) and JavaScript Object Notation (JSON), between client-side TEE provision logic 310 and server-side TEE provision logic 312. Service 314 may serve as an intermediary through which communications, such as TEE request 332, ID information request 322, and measurements 326 pass.

Server-side TEE provision logic 312 includes TEE 316, platform 318, and operating system 330. Operating system 330 runs on platform 318. Operating system 330 receives the TEE request from client-side TEE provision logic 310 via service 314. Operating system launches TEE 316 from a template based on receipt of the TEE request 332 from client-side TEE provision logic 310. TEE 316 may perform any one or more of the activities performed by TEE 206 of FIG. 2. As shown in FIG. 3, TEE 316 receives the ID information request 322 from client-side TEE provision logic 310 via service 314. TEE 316 generates a report request 324 based on receipt of the ID information request 322 from client-side TEE provision logic 310. The report request 324 requests the identifying information, which is specified by the ID information request 322. TEE 316 provides the report request 324 to platform 318.

TEE 316 receives the measurements 326 from platform 318 in response to the report request 324 being provided to platform 318. The measurements 326 include the identifying information. The measurements 326 may be signed with the platform signing key 320. TEE 316 may add self-reported measurements to the measurements 326 that are received from platform 318, resulting in an updated version of the measurements 326. TEE 316 may provide the updated version of the measurements 326 to platform 318 so that platform 318 can sign the updated version of the measurements 326 with the platform signing key 320. TEE 316 forwards the measurements 326 (e.g., the updated version of the measurements 326) to client-side TEE provision logic 310 in satisfaction of the ID information request 322.

Platform 318 may be one or more processors (e.g., a central processing unit (CPU)). Platform 318 may perform any one or more of the activities performed by platform 204 of FIG. 2. As shown in FIG. 2, platform 318 receives the report request 324 from TEE 316. Platform 318 gathers the measurements 326, including the identification information. For instance, platform 318 may gather the measurements 326 in response to receipt of the report request 324. Platform 318 provides the measurements 326 to TEE 316 in satisfaction of the report request 324. It should be noted that platform 318 is unable to change TEE 316 once TEE 316 is launched, though platform may terminate TEE 316. For instance, platform 318 is unable to change the identifying information that is included in the measurements 326. Platform 318 may be certified by an entity that a user of client device 302 (e.g., a customer of service 314) trusts. For instance, a signing key certificate of platform 318 may be issued (e.g., signed) by a manufacturer of platform 318 or by an attestation service. It will be recognized that platform 318 need not necessarily be included in server-side TEE provision logic 312. For instance, platform 318 may be external to server-side TEE provision logic 312.

Figure 4:
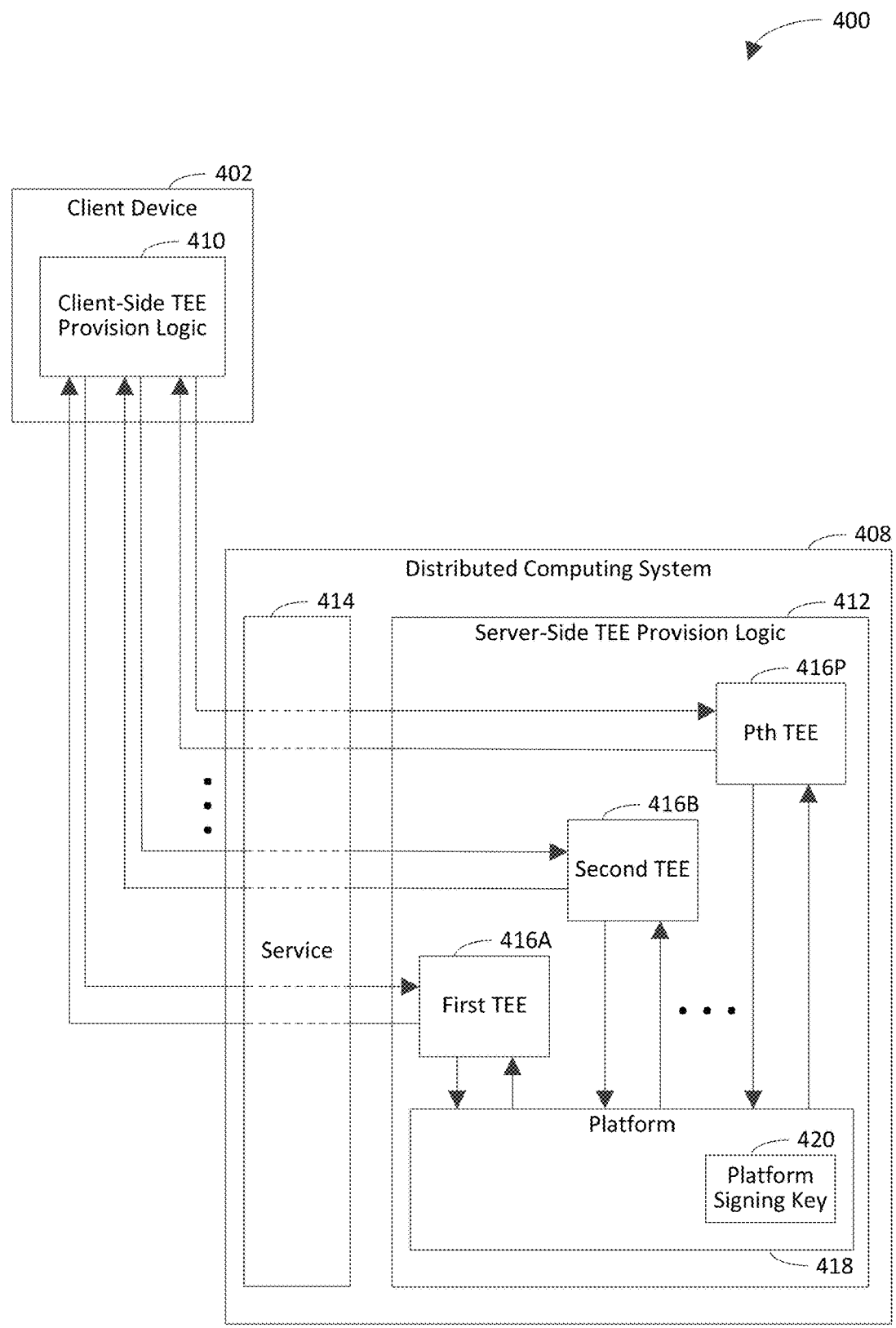

FIG. 4 is a block diagram of another example TEE provisioning system 400 in accordance with an embodiment. As shown in FIG. 4, TEE provisioning system 400 includes a client device 402 and a distributed computing system 408. Client device 402 includes client-side TEE provision logic 410, which is operable in a manner similar to client-side TEE provision logic 310 shown in FIG. 3. For instance, client-side TEE provision logic 410 provides ID information requests to respective TEEs 416A-416P and receives corresponding measurements from the respective TEEs 416A-416P. The measurements from each TEE identify the respective TEE. For instance, client-side TEE provision logic 410 may provide a first ID information request to a first TEE 416A and receive first measurements from first TEE 416A; client-side TEE provision logic 410 may provide a second ID information request to a second TEE 416B and receive second measurements from second TEE 416B, and so on.

Distributed computing system 408 includes a service 414 and server-side TEE provision logic 412. Service 414 is operable in a manner similar to service 314 shown in FIG. 3. For instance, service 414 hosts a platform 418, which executes TEEs 416A-416P.

Server-side TEE provision logic 412 includes TEEs 416A-416P and platform 418. Each of TEEs 416A-416P is operable in a manner similar to TEE 316 shown in FIG. 3. For instance, each of TEEs 416A-416P requests measurements that identify the respective TEE from platform 418 and forwards the measurements to client-side TEE provision logic 410 upon receipt of the measurements from platform 418. Each of the TEEs 416A-416P may add its own self-reported measurements to the measurements that are received from platform 418 before forwarding the measurements to client-side TEE provision logic 410. The measurements that are provided to client-side TEE provision logic 410 may be signed with a platform signing key 420 associated with platform 418.

Platform 418 is operable in a manner similar to platform 318 shown in FIG. 3. For instance, platform 418 executes an operating system that launches TEEs 416A-416P; platform 418 gathers the measurements for each of the TEEs 416A-416P; and platform 418 provides the measurements to the respective TEEs 416A-416P in satisfaction of the requests that are received from those TEEs 416A-416P. Platform 418 may sign the measurements for each of the TEEs 416A-416P before providing those measurements to the respective TEE.

It may be beneficial to establish initial consensus among TEEs 416A-416P before server-side TEE provision logic 412 begins to service requests from client-side TEE provision logic 410. The goal of initial consensus establishment is to make all the TEEs running on all platforms agree on an asymmetric "Provisioning Encryption Key" (PEK).

To establish initial consensus among TEEs 416A-416P, one of the TEEs 416A-416P may be designated as the "primary TEE". Any of TEEs 416A-416P may serve as the primary TEE. The primary TEE generates the PEK. Each peer TEE (i.e., each of the TEEs 416A-416P that is a peer of the primary TEE) generates a unique asymmetric Key Import Key (KIK). The primary TEE contacts each of its peers and imparts the PEK onto them by executing a sequence of steps once for each peer.

In a first step of the sequence, the primary TEE retrieves from a quote from the peer. The quote includes a public portion of the KIK (KIKpub) that is generated by that peer. In a second step, the primary TEE validates the received quote (e.g., by comparing the peer's measurements to its own or by other means, such as a higher version number of the same enclave) and confirms that the signature over the quote chains up to the platform associated with the TEE. If the check fails, the primary TEE terminates the attempt. In a third step, the primary TEE encrypts its PEK to KIKpub and sends them to the peer potentially along with its own quote, which includes PEKpub. In a fourth step, the peer may decrypt the received PEK and SSK using its private portion of the KIK (i.e., KIKpri).

At this point, any peer can start any suitable number of identical enclaves, all of which have access to the same PEK. Use of multiple identical peer enclaves on each TEE is supported so that each TEE can service multiple concurrent requests in a multi-threaded (thread pool) fashion. The same provisioning protocol may be used at any time to introduce another TEE into the set. A primary TEE may be removed just like any other peer TEE; the stateful service may automatically ensure that another TEE is designated as the primary TEE. With the initial consensus established, TEEs 416A-416P may start to provision flows, receiving customer-specific keys and policies.

The steps of the sequence described above are provided for illustrative purposes and are not intended to be limiting. It will be recognized that the sequence may not include one or more of the steps. Moreover, the sequence may include one or more steps in addition to or in lieu of any one or more of the steps described above.

A protocol to provide customer-specific provisioning may be executed once per TEE when client-side TEE provision logic 410 indicates that a new TEE is to be configured. In a first step of the protocol, client-side TEE provision logic 410 communicates with one of the TEEs 416A-416P randomly through a load balancer. Client-side TEE provision logic 410 retrieves a quote, which includes a public portion of the PEK (i.e., PEKpub), from the TEE. Since the TEEs 416A-416P share the same PEK, it does not matter which TEE client-side TEE provision logic 410 contacts first, or whether subsequent messages in this flow are received by the same TEE. However, data written out to shared storage by any TEE may be quickly made available to all peer TEEs.

In a second step, client-side TEE provision logic 410 receives and validates the quote in the response. If the response does not match expectations (e.g., the wrong TEE measurements are reported, or the signature does not check out), the provisioning process may be terminated and the attestation service instance may not be created. It should be noted that the TEE that client-side TEE provision logic 410 chooses to trust with its keys and policies is established out of band.

In a third step, client-side TEE provision logic 410 encrypts rules and secrets that are requested by the TEE with PEKpub and provides the encrypted rules and secrets to the TEE.

In a fourth step, any of TEEs 416A-416P receives the provisioning blob, decrypts the provisioning blob using a private portion of the PEK (i.e., PEKpri), and makes the provisioning blob available to its peer TEEs.

In a fifth step, the TEE responds with a quote that includes information from the provisioning blob. Client-side TEE provision logic 410 receives this blob, validates the blob, and has an option of deleting the new TEE if the quote does not validate correctly.

The client-side TEE provision logic 410 has the option of caching the PEKpub or re-querying the PEKpub from the TEE each time. In one example, client-side TEE provision logic 410 is responsible for maintaining a private portion of the PUK (i.e., PUKpri). In another example, client-side TEE provision logic 410 use a web service, such as Azure Key Vault, to maintain PUKpri.

The steps of the protocol described above are provided for illustrative purposes and are not intended to be limiting. It will be recognized that the protocol may not include one or more of the steps. Moreover, the protocol may include one or more steps in addition to or in lieu of any one or more of the steps described above.

Figure 5:
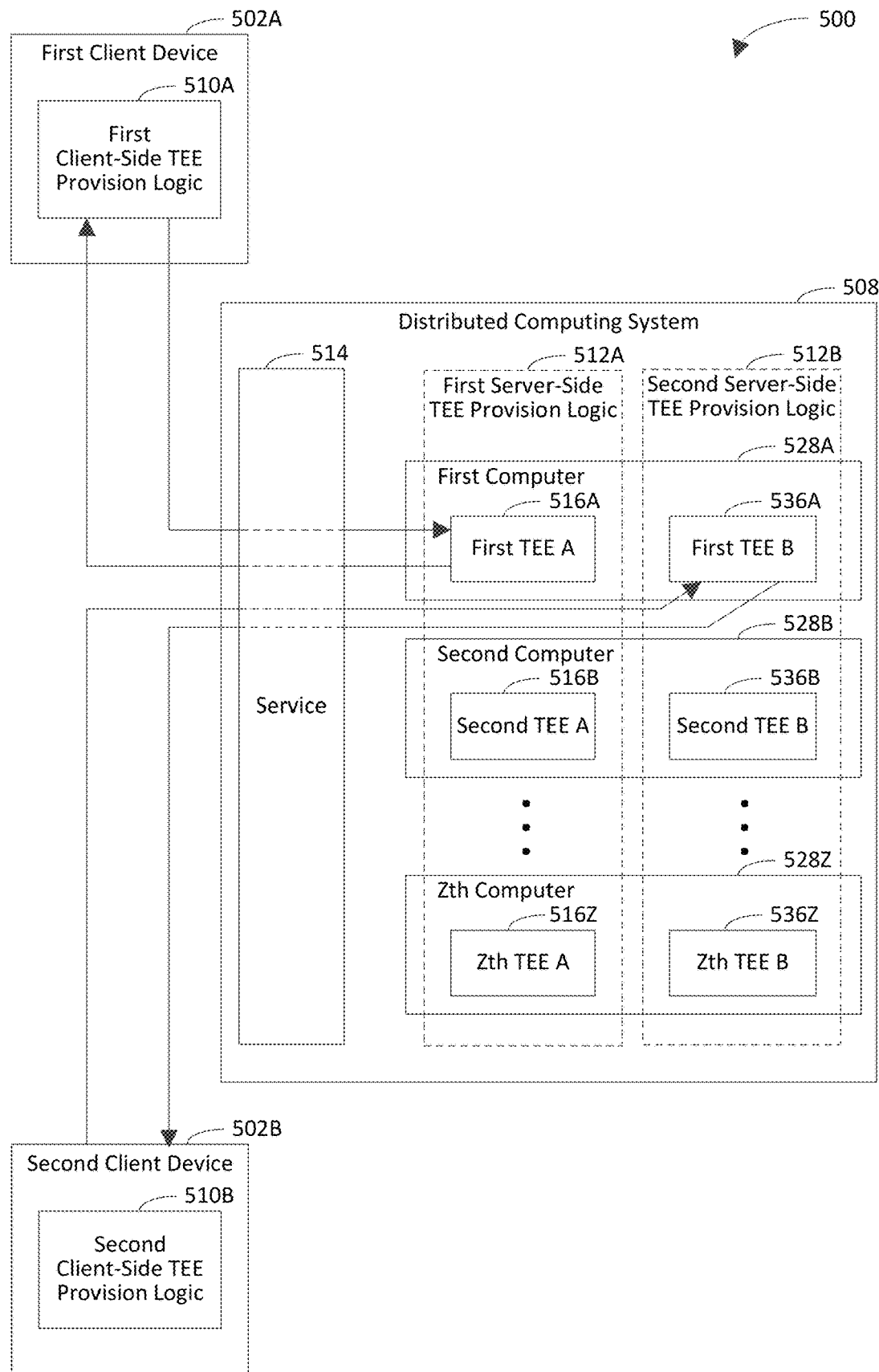

FIG. 5 is a block diagram of yet another example TEE provisioning system 500 in accordance with an embodiment. As shown in FIG. 5, TEE provisioning system 500 includes a first client device 502A, a second client device 502B, and a distributed computing system 508. First client device 502A may be owned or operated by customer A of a service 514, and second device 502B may be owned or operated by customer B of service 514. The first and second client devices 502A and 502B include client-side TEE provision logic 510A and 510B, respectively. Each of the first client-side TEE provision logic 510A and the second client-side TEE provision logic 510BG is operable in a manner similar to client-side TEE provision logic 310 shown in FIG. 3. For instance, first client-side TEE provision logic 510A provides first ID information requests to respective TEEs 516A-516Z and receives corresponding measurements from the respective TEEs 516A-516Z. Second client-side TEE provision logic 510B provides second ID information requests to respective TEEs 536A-536Z and receives corresponding measurements from the respective TEEs 536A-536Z. The measurements from each TEE identify the respective TEE. TEEs 516A-516Z are labeled as "first TEE A," "second TEE A," and so on in FIG. 5 to indicate that TEEs 516A-516Z correspond to customer A. TEEs 536A-536Z are labeled as "first TEE B," "second TEE B," and so on in FIG. 5 to indicate that TEEs 536A-536Z correspond to customer B.

Distributed computing system 508 includes a service 514 and a plurality of computers 528A-528Z. Service 514 is operable in a manner similar to service 314 shown in FIG. 3. For instance, service 514 hosts platforms associated with the respective computers 528A-528N. The platforms execute respective TEEs 516A-516Z, which correspond to customer A, and respective TEEs 536A-536Z, which correspond to customer B. Accordingly, each of the platforms executes a TEE that corresponds to customer A and a TEE that corresponds to customer B. For instance, the platform associated with first computer 528A executes first TEE A 516A, which corresponds to customer A, and first TEE B 536A, which corresponds to customer B; the platform associated with second computer 528B executes second TEE A 516B, which corresponds to customer A, and second TEE B 536B, which corresponds to customer B, and so on. It will be recognized that each of the platforms is described as executing a single TEE corresponding to each of the customers A and B for illustrative purposes and is not intended to be limiting. For instance, each of the platforms associated with the respective computers 528A-528Z may host any suitable number (e.g., 1, 2, 3, or 4) of TEEs corresponding to each customer.

Distributed computing system 508 includes first server-side TEE provision logic 512A and second server-side TEE provision logic 512B. First server-side TEE provision logic 512A includes TEEs 516A-516Z, which correspond to customer A. Second server-side TEE provision logic 512B includes TEEs 536A-536Z, which correspond to customer B. Each of TEEs 516A-516Z and each of TEEs 536A-536Z is operable in a manner similar to TEE 316 shown in FIG. 3. For example, TEEs 516A-516Z request measurements that identify the respective TEEs 516A-516Z from the respective platforms associated with the respective computers 528A-528Z and forward the measurements to first client-side TEE provision logic 510A upon receipt of the measurements from the respective platforms. The TEEs 516A-516Z may add their own self-reported measurements to the measurements that are received from the respective platforms associated with the respective computers 528A-528Z before forwarding the measurements to first client-side TEE provision logic 510A. The measurements that are provided to first client-side TEE provision logic 510A by the respective TEEs 516A-516Z may be signed with platform signing keys associated with the respective platforms.

In another example, TEEs 536A-536Z request measurements that identify the respective TEEs 536A-536Z from the respective platforms associated with the respective computers 528A-528Z and forward the measurements to second client-side TEE provision logic 510B upon receipt of the measurements from the respective platforms. The TEEs 536A-536Z may add their own self-reported measurements to the measurements that are received from the respective platforms associated with the respective computers 528A-528Z before forwarding the measurements to second client-side TEE provision logic 510B. The measurements that are provided to second client-side TEE provision logic 510B by the respective TEEs 536A-536Z may be signed with platform signing keys associated with the respective platforms.

Figure 6:
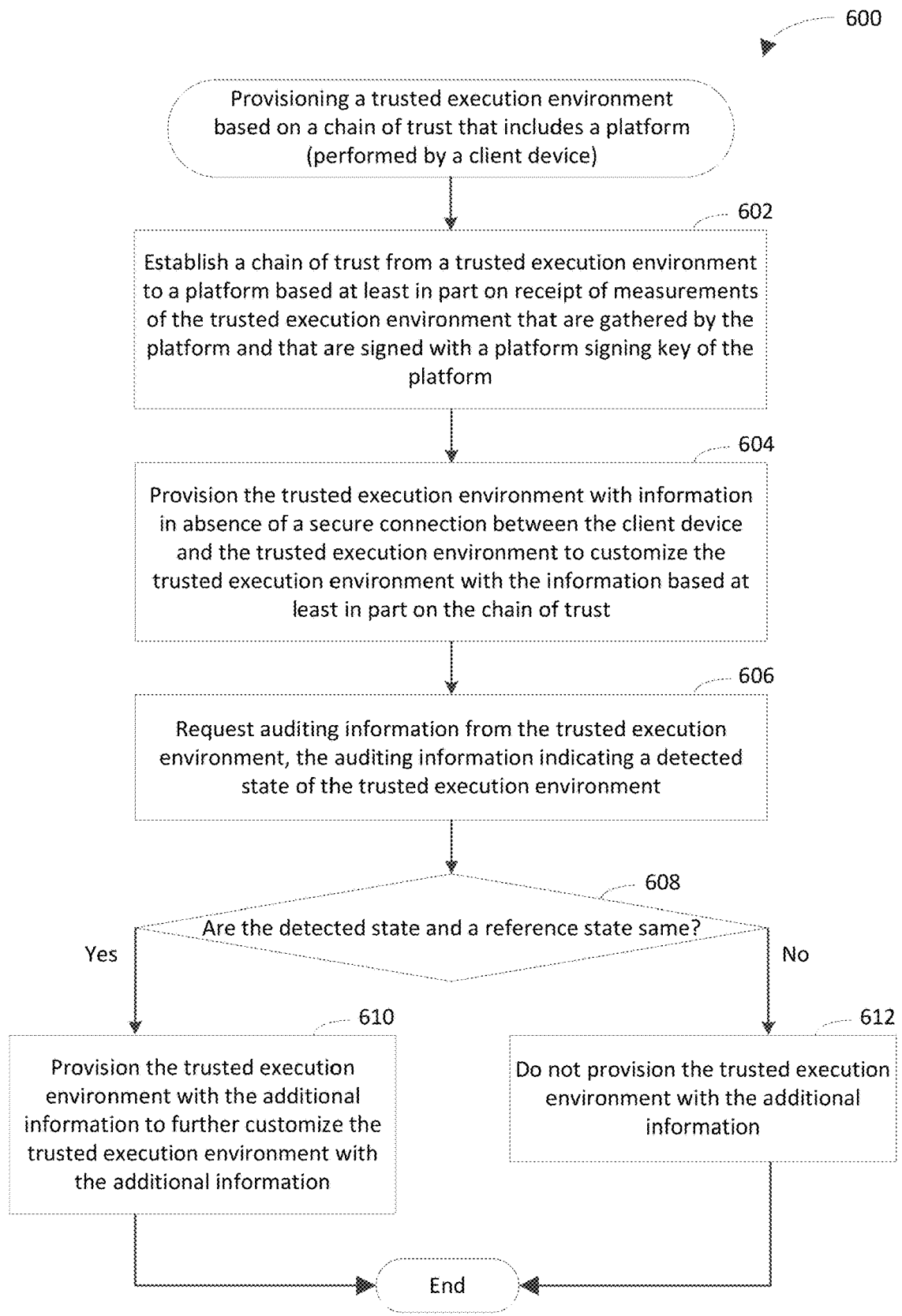
FIG. 6 depicts a flowchart of an example method for provisioning a TEE based on a chain of trust that includes a platform on which the TEE executes in accordance with an embodiment.
Figure 7:
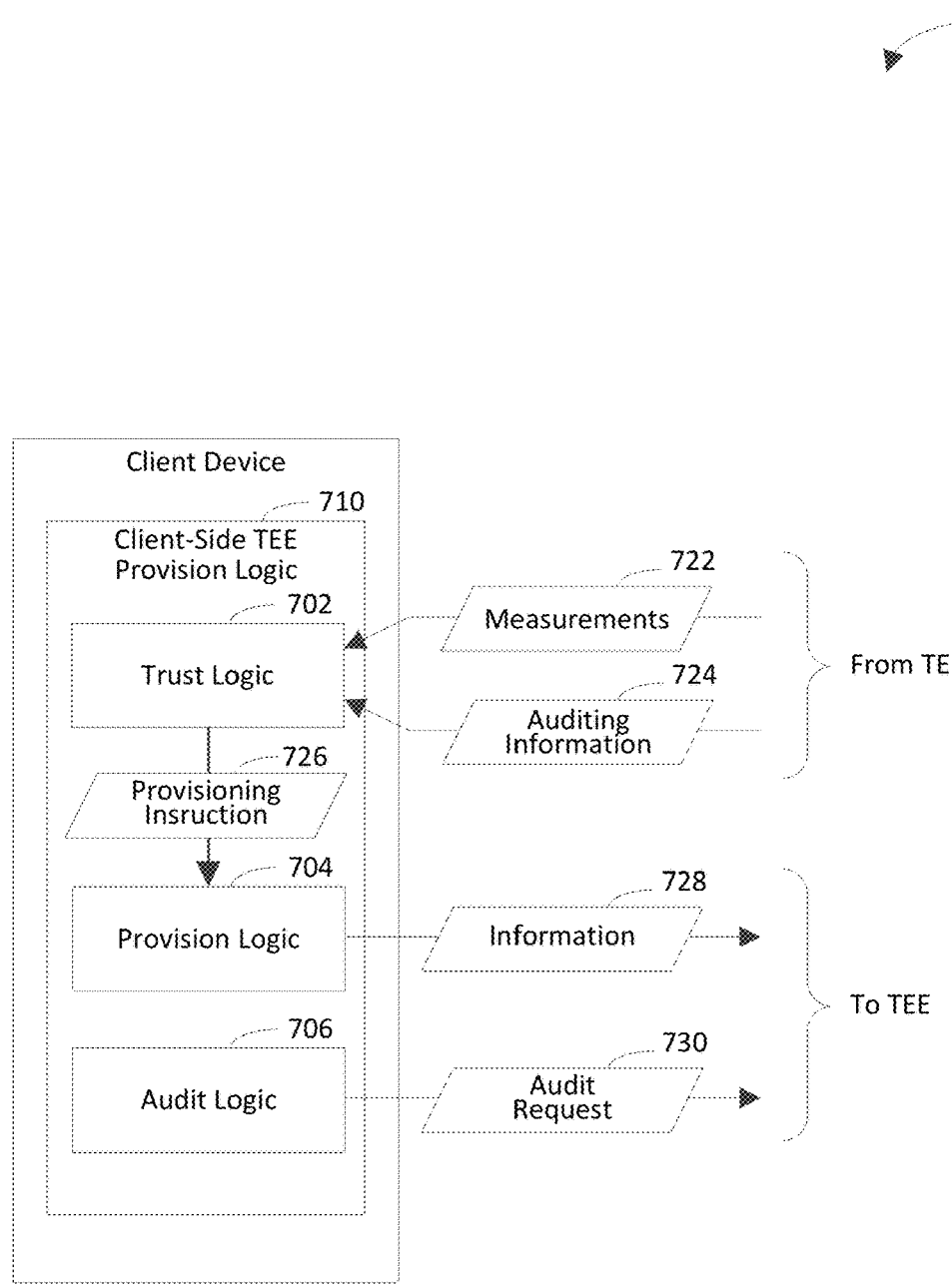
FIG. 7 is a block diagram of an example implementation of a client device in accordance with an embodiment.

FIG. 6 depicts a flowchart 600 of an example method for provisioning a TEE based on a chain of trust that includes a platform on which the TEE executes in accordance with an embodiment. Flowchart 600 may be performed by any of user devices 102A-102M shown in FIG. 1, for example. For illustrative purposes, flowchart 600 is described with respect to client device 700 shown in FIG. 7. Client device 700 includes client-side TEE provision logic 710. Client-side TEE provision logic 710 includes trust logic 702, provision logic 704, and audit logic 706. Further structural and operational embodiments will be apparent to persons skilled in the relevant art(s) based on the discussion regarding flowchart 600.

The method of FIG. 6 is described from the perspective of a client device. As shown in FIG. 6, the method of flowchart 600 begins at step 602. In step 602, a chain of trust from a trusted execution environment to a platform is established based at least in part on receipt of measurements of the trusted execution environment that are gathered by the platform and that are signed with a platform signing key of the platform. For instance, the chain of trust may be established out-of-band (e.g., not as part of the protocol of communication between the client device and the trusted execution environment). The measurements indicate attributes of the trusted execution environment, which is hosted by a distributed computing system (e.g., private cloud or public cloud) coupled to the client device. For instance, the measurements may indicate unforgeable attributes of trusted execution environment (e.g., an author, publisher, security version number, code type, and/or compilation date of the trusted execution environment and/or a key used to sign the measurements). The platform vouches for the measurements (e.g., by signing the measurements with the platform signing key). The platform is configured to execute an operating system that launches the trusted execution environment from a template. For instance, the template may be executable code. For instance, the template may be a piece of executable code that has not been customized with regard to a client device or customer associated therewith. The template represents a known starting point for customizing the TEE. Accordingly, the template may include nothing that is customer-specific. For instance, the template may not include any customer secrets (e.g., secret keys, code, and/or data of the customer).

In an example implementation, trust logic 702 establishes the chain of trust based at least in part on receipt of measurements 722 of the trusted execution environment that are gathered by the platform and signed with the platform signing key. It should be noted that trust logic 702 may receive self-reported measurements from the trusted execution environment in addition to the measurements that are gathered by the platform. The self-reported measurements also may be signed with the platform signing key. Trust logic 702 may generate a provisioning instruction 726 based on the chain of trust being established. For instance, the provisioning instruction 726 may instruct provisioning logic 704 to provision the trusted execution environment with information 728.

In an example embodiment, establishing the chain of trust at step 602 includes using a public key that corresponds to the platform signing key to verify that the measurements are signed with the platform signing key. For instance, the platform signing key and the public key may form an asymmetric key pair. The platform signing key is in the possession of the platform. The certificate that corresponds to the platform signing key (a.k.a. the platform signing key certificate) may or may not be in the possession of the platform. For instance, the platform may provide an identifier that can be used with a service associated with the platform to obtain the platform signing key certificate. The platform signing key may be queried from the platform or from a manufacturer of the platform.

At step 604, the trusted execution environment is provisioned (e.g., imbued) with information in absence of a secure channel between the client device and the trusted execution environment to customize the trusted execution environment with the information based at least in part on the chain of trust. For instance, the trusted execution environment may be provisioned with the information to set up a web service, attestation service, database, machine learning system, etc. In an example implementation, provision logic 704 provisions the trusted execution environment with the information 728 to customize the trusted execution environment with the information 728 based at least in part on the chain of trust. For instance, provision logic 704 may provision the trusted execution environment with the information 728 based on receipt of the provisioning instruction 726.

In an example embodiment, the trusted execution environment is securely provisioned with the information. To securely provision the trusted execution environment with the information means to be cryptographically convinced that the trusted execution environment has received rules that have been provided (e.g., from the client device in this example) to the trusted execution environment for enforcement, and the information has been provided to the trusted execution environment without the information being disclosed to entities other than the trusted execution environment. For instance, securely provisioning the trusted execution environment with the information may require that the trusted execution environment is able to repeat the information back to the provider of the information (e.g., back to the client device in this example).

At step 606, auditing information is requested from the trusted execution environment. The auditing information indicates a detected state of the trusted execution environment. For example, the detected state may indicate whether the trusted execution environment is operating on the latest policies, with the latest keys, with the latest data, with the latest code, etc. In another example, the detected state may indicate confirm receipt of specified information (e.g., specified rules, keys, data, or code). In an example implementation, audit logic 706 requests auditing information 724 from the trusted execution environment. For instance, audit logic 706 may generate an audit request 730, which requests the auditing information 724.

At step 608, a determination is made whether the detected state and a reference state are same. For instance, a determination as to whether the trusted execution environment is to be provisioned with additional information may be based on whether the detected state and the reference state are the same. In an example implementation, trust logic 702 determines whether the detected state and the reference state are the same. For example, trust logic 702 may receive the auditing information 724. In accordance with this example, trust logic 702 may analyze the auditing information 724 to determine the detected state of the trusted execution environment. In further accordance with this example, trusted logic 702 may compare the detected state to the reference state to determine whether the detected state and the reference state are the same. In an aspect of this implementation, trust logic 702 may be configured to generate an additional provisioning instruction in response to the detected state and the reference state being the same. The additional provisioning instruction may instruct provision logic 704 to provision the trusted execution environment with additional information. Trust logic 702 may be configured to not generate the additional provisioning instruction in response to the detected state and the reference state not being the same. If the detected state and the reference state are the same, flow continues to step 610. Otherwise, flow continues to step 612.

At step 610, the trusted execution environment is provisioned with the additional information to further customize the trusted execution environment with the additional information. For example, the trusted execution environment may be provisioned with the additional information in absence of the secure channel between the client device and the trusted execution environment. In another example, the trusted execution environment may be provisioned with the additional information based at least in part on the detected state and the reference state being the same. In an example implementation, provision logic 704 provisions the trusted execution environment with the additional information.

At step 612, the trusted execution environment is not provisioned with the additional information. In an example implementation, provision logic 704 does not provision the trusted execution environment with the additional information.

In some example embodiments, one or more steps 602, 604, 606, 608, 610, and/or 612 of flowchart 600 may not be performed. Moreover, steps in addition to or in lieu of steps 602, 604, 606, 608, 610, and/or 612 may be performed. For instance, in an example embodiment, the distributed computing system provides a cloud service. In accordance with this embodiment, the method of flowchart 600 further includes using cryptographic communications to exclude entities other than the client device from knowing the information and to exclude the other entities from manipulating the information. In further accordance with this embodiment, the other entities include a provider of the cloud service. The provider of the cloud service may own the platform, though the example embodiments are not limited in this respect. In an aspect of this embodiment, using the cryptographic communications may be further to exclude the other entities from knowing responses from the trusted execution environment regarding the information and to exclude the other entities from manipulating the responses. In another aspect of this embodiment, provisioning the trusted execution environment with the information at step 604 may include provisioning the trusted execution environment with the information in plain view of the provider of the cloud service. In an example implementation, trust logic 702 and/or provision logic 704 may use the cryptographic communications to exclude the entities other than client device 700 from knowing the information 728 and to exclude the other entities from manipulating the information 728.

In another example embodiment, provisioning the trusted execution environment with the information at step 604 includes provisioning the trusted execution environment with at least one policy in absence of the secure channel between the client device and the trusted execution environment based at least in part on the chain of trust. Examples of a policy include but are not limited to (1) a requirement that specified condition(s) are satisfied in order for a signature to be applied to information (e.g., information of a designated type) and (2) a requirement that a specified procedure is to be followed in order to update rules (e.g., a designated signing key is to be used to sign the rules). In an example implementation, provision logic 704 provisions the trusted execution environment with the at least one policy.

In an aspect of this embodiment, the method of flowchart 600 further includes providing an update regarding the at least one policy to the trusted execution environment. For instance, the at least one policy may indicate that the update is to be verified by the trusted execution environment based at least in part on the update being signed with the private key. In an example implementation, provision logic 704 may provide the update to the trusted execution environment. In further accordance with this aspect, the update is signed with a policy update key. The policy update key corresponds to a public key that is usable by the trusted execution environment to verify that the update is provided by the client device.

In yet another example embodiment, provisioning the trusted execution environment with the information at step 604 includes provisioning the trusted execution environment with secret information in absence of the secure channel between the client device and the trusted execution environment based at least in part on the chain of trust. The secret information includes data, software code, and/or key(s). In an example implementation, provision logic 704 provisions the trusted execution environment with the secret information.

In an aspect of this embodiment, the method of flowchart 600 further includes encrypting the secret information with a secret import key that is received from the trusted execution environment. The secret import key corresponds to a private key that is usable by the trusted execution environment to decrypt the secret information. In an example implementation, provision logic 704 encrypts the secret information with the secret import key.

In another aspect of this embodiment, provisioning the trusted execution environment with the information at step 604 includes provision the trusted execution environment with at least one policy in absence of the secure channel between the client device and the trusted execution environment based at least in part on the chain of trust. In accordance with this aspect, the method of flowchart 600 further includes determining whether to provision the trusted execution environment with the secret information based at least in part on whether the client device receives confirmation from the trusted execution environment that the trusted execution environment has received the at least one policy from the client device. In an example implementation, provision logic 704 determines whether to provision the trusted execution environment with the secret information based at least in part on whether client device 700 receives confirmation from the trusted execution environment that the trusted execution environment has received the at least one policy from client device 700. For instance, provision logic 704 may be configured to provision the trusted execution environment with the secret information in response to client device 700 receiving the confirmation. Provision logic 704 may be configured to not provision the trusted execution environment with the secret information in response to client device 700 not receiving the confirmation.

In further accordance with this aspect, provisioning the trusted execution environment with the secret information is performed based at least in part on receipt of the confirmation from the trusted execution environment that the trusted execution environment has received the at least one policy from the client device. For example, the confirmation may include the at least one policy. In accordance with this example, the trusted execution environment may repeat the at least one policy back to the client device to enable the client device to confirm that the at least one policy that is repeated back to the client device is the same as the at least one policy with which the trusted execution environment was provisioned. It should be noted that provisioning the trusted execution environment with the secret information may be contingent on the trusted execution environment providing assurance that the trusted execution environment will enforce the at least one policy.

In still another example embodiment, the method of flowchart 600 further includes encrypting a public portion of a policy update key that is associated with the client device with a public portion of a provisioning encryption key. For instance, trust logic 702 may encrypt the public portion of the policy update key with the public portion of the provisioning encryption key. The policy update key has a private portion that is usable by the client device to sign an update regarding at least one policy that is to be provided to the trusted execution environment. The provisioning encryption key has a private portion that is associated with a plurality of trusted execution environments. The private portion of the provisioning encryption key is usable by the trusted execution environment to decrypt the public portion of the policy update key. The plurality of trusted execution environments includes the trusted execution environment.

It will be recognized that client device 700 may not include one or more of trust logic 702, provision logic 704, and/or audit logic 706. Furthermore, client device 700 may include components in addition to or in lieu of trust logic 702, provision logic 704, and/or audit logic 706.

Figure 8:
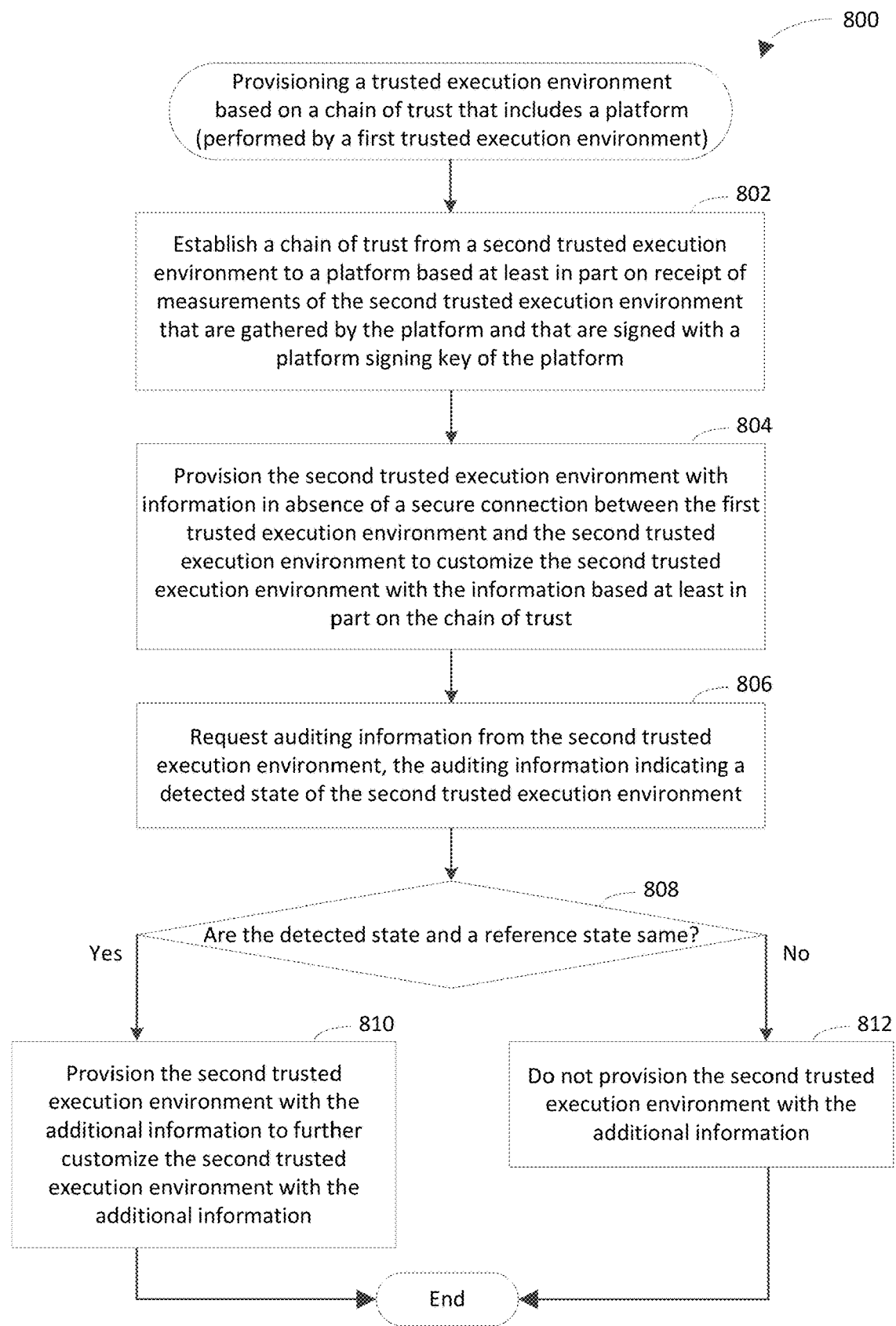
FIG. 8 depicts a flowchart of another example method for provisioning a TEE based on a chain of trust that includes a platform on which the TEE executes in accordance with an embodiment.
Figure 9:
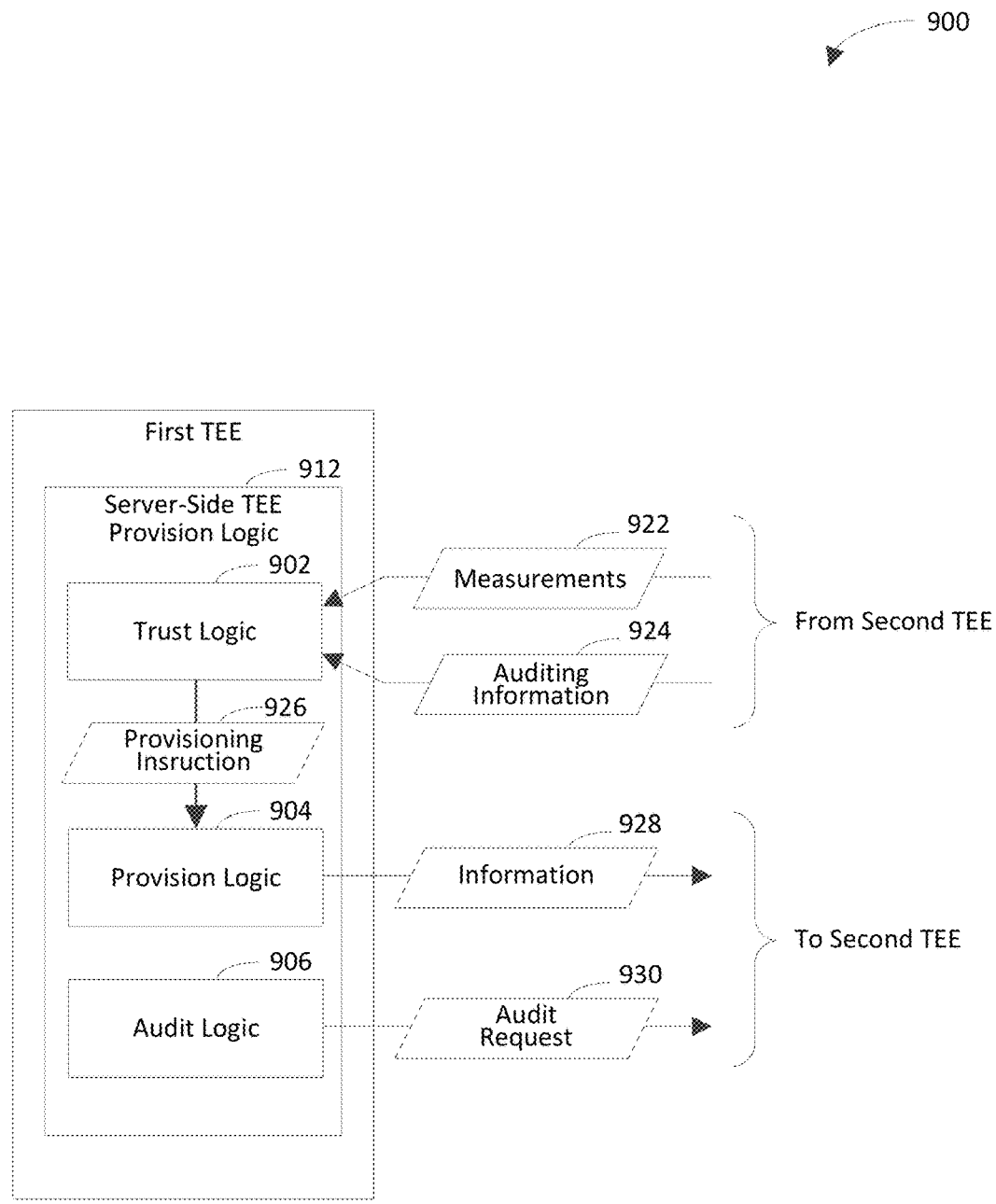
FIG. 9 is a block diagram of an example implementation of a TEE in accordance with an embodiment.

FIG. 8 depicts a flowchart 800 of another example method for provisioning a TEE based on a chain of trust that includes a platform on which the TEE executes in accordance with an embodiment. Flowchart 800 may be performed by any one or more of servers 106A-106N shown in FIG. 1 (e.g., by a TEE executing thereon), for example. For illustrative purposes, flowchart 800 is described with respect to first TEE 900 shown in FIG. 9. First TEE 900 includes server-side TEE provision logic 912. Server-side TEE provision logic 912 includes trust logic 902, provision logic 904, and audit logic 906. Further structural and operational embodiments will be apparent to persons skilled in the relevant art(s) based on the discussion regarding flowchart 800.

The method of FIG. 8 is described from the perspective of a first trusted execution environment. As shown in FIG. 8, the method of flowchart 800 begins at step 802. In step 802, a chain of trust from a second trusted execution environment to a platform is established based at least in part on receipt of measurements of the second trusted execution environment that are gathered by the platform and that are signed with a platform signing key of the platform. The measurements indicate attributes of the second trusted execution environment. The second trusted execution environment is hosted by a distributed computing system that hosts the first trusted execution environment. The platform is configured to execute an operating system that launches the second trusted execution environment from a template. The operating system may be configured to launch the first trusted execution environment from the template, as well. In an example implementation, trust logic 902 establishes the chain of trust based at least in part on receipt of measurements 922 of the second trusted execution environment that are gathered by the platform and signed with the platform signing key. It should be noted that trust logic 902 may receive self-reported measurements from the second trusted execution environment in addition to the measurements that are gathered by the platform. The self-reported measurements also may be signed with the platform signing key. Trust logic 902 may generate a provisioning instruction 926 based on the chain of trust being established. For instance, the provisioning instruction 926 may instruct provisioning logic 904 to provision the second trusted execution environment with information 928.

In an example embodiment, establishing the chain of trust at step 802 includes establishing the chain of trust from the second trusted execution environment to the platform further based at least in part on receipt of a notice from the second trusted execution environment. In accordance with this embodiment, the notice informs the first trusted execution environment of existence of the second trusted execution environment.

In another example embodiment, establishing the chain of trust at step 802 includes using a public key that corresponds to the platform signing key to verify that the measurements are signed with the platform signing key.

At step 804, the second trusted execution environment is provisioned (e.g., securely provisioned) with information in absence of a secure channel between the first trusted execution environment and the second trusted execution environment to customize the second trusted execution environment with the information based at least in part on the chain of trust. In an example implementation, provision logic 904 provisions the second trusted execution environment with the information 828 to customize the second trusted execution environment with the information 928 based at least in part on the chain of trust. For instance, provision logic 904 may provision the second trusted execution environment with the information 928 based on receipt of the provisioning instruction 926.

At step 806, auditing information is requested from the second trusted execution environment. The auditing information indicates a detected state of the second trusted execution environment. In an example implementation, audit logic 906 requests auditing information 924 from the second trusted execution environment. For instance, audit logic 906 may generate an audit request 930, which requests the auditing information 924.

At step 808, a determination is made whether the detected state and a reference state are same. In an example implementation, trust logic 902 determines whether the detected state and the reference state are the same. For example, trust logic 902 may analyze the auditing information 924 to determine the detected state of the trusted execution environment. In accordance with this example, trusted logic 902 may compare the detected state to the reference state to determine whether the detected state and the reference state are the same. In an aspect of this implementation, trust logic 902 may be configured to generate an additional provisioning instruction in response to the detected state and the reference state being the same. The additional provisioning instruction may instruct provision logic 904 to provision the second trusted execution environment with additional information. Trust logic 902 may be configured to not generate the additional provisioning instruction in response to the detected state and the reference state not being the same. If the detected state and the reference state are the same, flow continues to step 810. Otherwise, flow continues to step 812.

At step 810, the second trusted execution environment is provisioned with the additional information to further customize the second trusted execution environment with the additional information. For example, the second trusted execution environment may be provisioned with the additional information in absence of the secure channel between the first trusted execution device and the second trusted execution environment. In another example, the second trusted execution environment may be provisioned with the additional information based at least in part on the detected state and the reference state being the same. In an example implementation, provision logic 904 provisions the second trusted execution environment with the additional information.

At step 812, the second trusted execution environment is not provisioned with the additional information. In an example implementation, provision logic 904 does not provision the second trusted execution environment with the additional information.

In an example embodiment, establishing the chain of trust at step 802 includes establishing the chain of trust in accordance with a consensus algorithm that is configured to provide redundancy of the first trusted execution environment. A consensus algorithm is an algorithm that is configured to perform consensus among multiple unreliable entities (e.g., TEEs). Consensus is a process by which the multiple unreliable entities agree on a common (e.g., single) result. In accordance with this embodiment, provisioning the second trusted execution environment with the information at step 804 includes provisioning the second trusted execution environment with the information in accordance with the consensus algorithm. In further accordance with this embodiment, the information includes policies and secret information, which are copied from the first trusted execution environment. In an aspect of this embodiment, establishing the chain of trust at step 802 is performed in response to a cloud service that is provided by the distributed computing system instructing an operating system that runs on the platform to launch the second trusted execution environment in accordance with the consensus algorithm.

In some example embodiments, one or more steps 802, 804, 806, 808, 810, and/or 812 of flowchart 800 may not be performed. Moreover, steps in addition to or in lieu of steps 802, 804, 806, 808, 810, and/or 812 may be performed. For instance, in an example embodiment, the method of flowchart 800 further includes using cryptographic communications to exclude entities other than the first trusted execution environment from knowing the information and to exclude the other entities from manipulating the information. The other entities include a provider of a cloud service that is hosted by the distributed computing system. In an example implementation, trust logic 902 and/or provision logic 904 may use the cryptographic communications to exclude the entities other than first trusted execution environment 900 from knowing the information 928 and to exclude the other entities from manipulating the information 928.

In another example embodiment, provisioning the second trusted execution environment at step 804 includes provisioning the second trusted execution environment with at least one policy in absence of the secure channel between the first trusted execution environment and the second trusted execution environment based at least in part on the chain of trust. In an example implementation, provision logic 904 provisions the second trusted execution environment with the at least one policy.

In an aspect of this embodiment, the method of flowchart 800 further includes providing an update regarding the at least one policy to the second trusted execution environment. In an example implementation, provision logic 904 may provide the update to the second trusted execution environment. In accordance with this aspect, the update is signed with a policy update key, which corresponds to a public key that is usable by the second trusted execution environment to verify that the update is provided by the first trusted execution environment.

In yet another example embodiment, provisioning the second trusted execution environment at step 802 includes provisioning the second trusted execution environment with secret information in absence of the secure channel between the first trusted execution environment and the second trusted execution environment based at least in part on the chain of trust. The secret information includes data, software code, and/or key(s). In an example implementation, provision logic 904 provisions the second trusted execution environment with the secret information.

In an aspect of this embodiment, the method of flowchart 800 further includes encrypting the secret information with a secret import key that is received from the second trusted execution environment. In accordance with this embodiment, the secret import key corresponds to a private key that is usable by the second trusted execution environment to decrypt the secret information. In an example implementation, provision logic 904 encrypts the secret information with the secret import key.

In another aspect of this embodiment, provisioning the second trusted execution environment with the information at step 804 includes provisioning the second trusted execution environment with at least one policy in absence of the secure channel between the first trusted execution environment and the second trusted execution environment based at least in part on the chain of trust. In accordance with this aspect, the method of flowchart 800 further includes determining whether to provision the second trusted execution environment with the secret information based at least in part on whether the first trusted execution environment receives confirmation from the second trusted execution environment that the second trusted execution environment has received the at least one policy from the first trusted execution environment. In an example implementation, provision logic 904 determines whether to provision the second trusted execution environment with the secret information based at least in part on whether first trusted execution environment 900 receives confirmation from the second trusted execution environment that the second trusted execution environment has received the at least one policy from first trusted execution environment 900. For instance, provision logic 904 may be configured to provision the second trusted execution environment with the secret information in response to first trusted execution environment 900 receiving the confirmation. Provision logic 904 may be configured to not provision the second trusted execution environment with the secret information in response to first trusted execution environment 900 not receiving the confirmation.

In further accordance with this aspect, provisioning the second trusted execution environment at step 804 includes provisioning the second trusted execution environment with the secret information in absence of the secure channel between the first trusted execution environment and the second trusted execution environment based at least in part on receipt of the confirmation from the second trusted execution environment that the second trusted execution environment has received the at least one policy from the first trusted execution environment. For instance, the confirmation may include the at least one policy.

In still another example embodiment, the method of flowchart 800 includes collaborating with other trusted execution environments in a plurality of trusted execution environments to have a provisioning encryption key provided to each of the plurality of trusted execution environments in accordance with a consensus algorithm. For instance, provision logic 904 may collaborate with the other trusted execution environments to have the provisioning encryption key provided to each of the plurality of trusted execution environments in accordance with the consensus algorithm. The plurality of trusted execution environments includes the first and second trusted execution environments. In accordance with this embodiment, the method of flowchart 800 includes encrypting the information with a public portion of the provisioning encryption key. For instance, provision logic 904 may encrypt the information 928 with the public portion of the provisioning encryption key. The information may be capable of being decrypted with a private portion of the provisioning encryption key by the second trusted execution environment. In further accordance with this embodiment, the method of flowchart 800 includes provisioning the second trusted execution environment with the information in response to encrypting the information with the public portion of the provisioning encryption key. In an aspect of this embodiment, collaborating with the other trusted execution environments includes encrypting the provisioning encryption key, for each of the other trusted execution environments that is to receive the provisioning encryption key from the first trusted execution environment, with a public portion of a secret import key associated with the respective trusted execution environment. The provisioning encryption key may be capable of being decrypted by each trusted execution environment that is to receive the provisioning encryption key from the first trusted execution environment with a private portion of the secret import key that is associated with the respective trusted execution environment.

It will be recognized that first TEE 900 may not include one or more of trust logic 902, provision logic 904, and/or audit logic 906. Furthermore, first TEE 900 may include components in addition to or in lieu of trust logic 902, provision logic 904, and/or audit logic 906.

Figure 10:
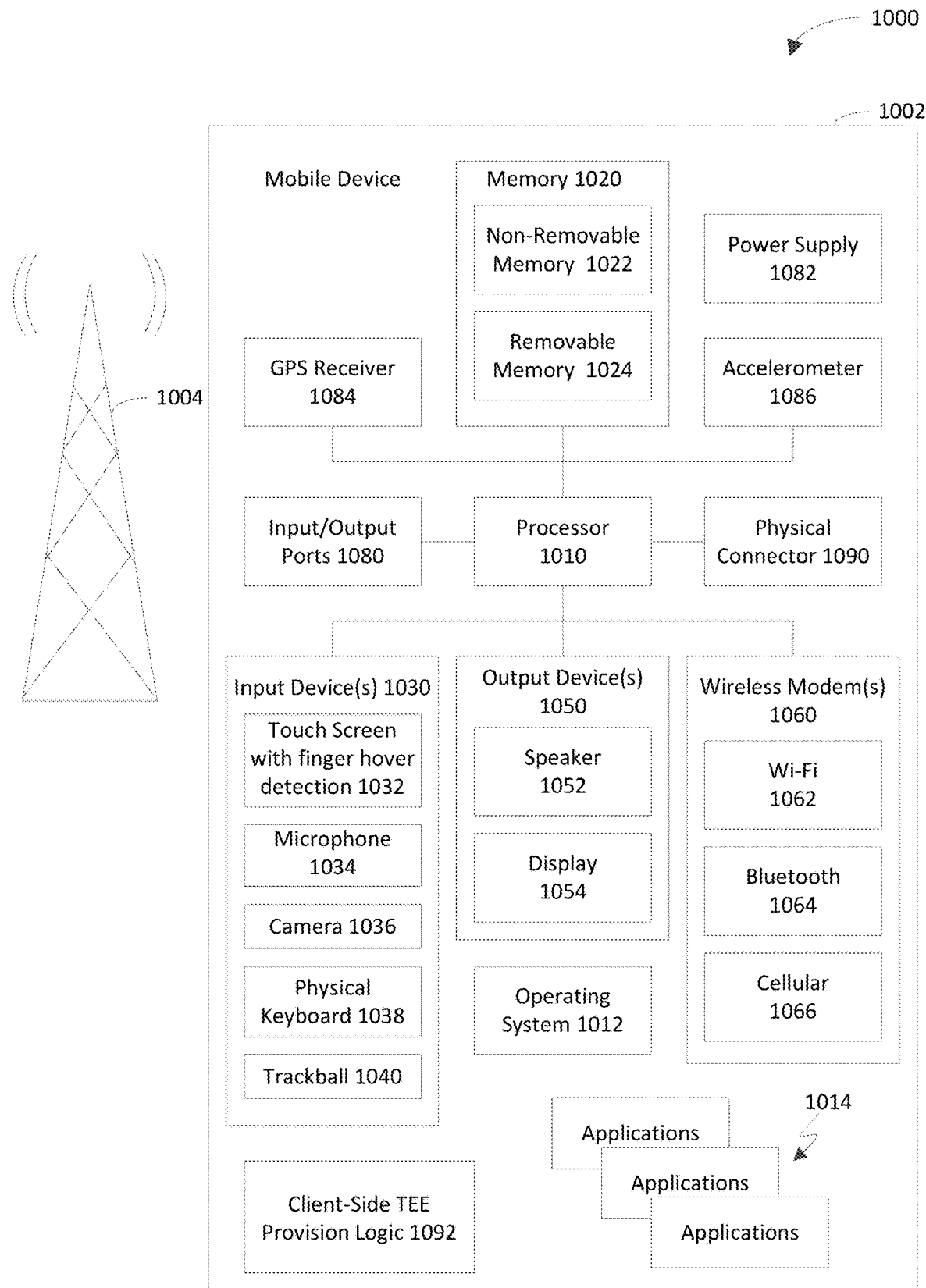
FIG. 10 is a system diagram of an exemplary mobile device in accordance with an embodiment.

FIG. 10 is a system diagram of an exemplary mobile device 1000 including a variety of optional hardware and software components, shown generally as 1002. Any components 1002 in the mobile device may communicate with any other component, though not all connections are shown, for ease of illustration. The mobile device 1000 may be any of a variety of computing devices (e.g., cell phone, smartphone, handheld computer, Personal Digital Assistant (PDA), etc.) and may allow wireless two-way communications with one or more mobile communications networks 1004, such as a cellular or satellite network, or with a local area or wide area network.

The mobile device 1000 may include a processor 1010 (e.g., signal processor, microprocessor, ASIC, or other control and processing logic circuitry) for performing such tasks as signal coding, data processing, input/output processing, power control, and/or other functions. An operating system 1012 may control the allocation and usage of the components 1002 and support for one or more applications 1014 (a.k.a. application programs). The applications 1014 may include common mobile computing applications (e.g., email applications, calendars, contact managers, web browsers, messaging applications) and any other computing applications (e.g., word processing applications, mapping applications, media player applications).

The mobile device 1000 may include memory 1020. The memory 1020 may include non-removable memory 1022 and/or removable memory 1024. The non-removable memory 1022 may include RAM, ROM, flash memory, a hard disk, or other well-known memory storage technologies. The removable memory 1024 may include flash memory or a Subscriber Identity Module (SIM) card, which is well known in GSM communication systems, or other well-known memory storage technologies, such as "smart cards." The memory 1020 may store data and/or code for running the operating system 1012 and the applications 1014. Example data may include web pages, text, images, sound files, video data, or other data sets to be sent to and/or received from one or more network servers or other devices via one or more wired or wireless networks. Memory 1020 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1000 may support one or more input devices 1030, such as a touch screen 1032, microphone 1034, camera 1036, physical keyboard 1038 and/or trackball 1040 and one or more output devices 1050, such as a speaker 1052 and a display 1054. Touch screens, such as the touch screen 1032, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1032 may support a finger hover detection using capacitive sensing, as is well understood in the art. Other detection techniques may be used, including but not limited to camera-based detection and ultrasonic-based detection. To implement a finger hover, a user's finger is typically within a predetermined spaced distance above the touch screen, such as between 0.1 to 0.25 inches, or between 0.0.25 inches and 0.05 inches, or between 0.0.5 inches and 0.75 inches, or between 0.75 inches and 1 inch, or between 1 inch and 1.5 inches, etc.

The mobile device 1000 may include client-side TEE provision logic 1092. The client-side TEE provision logic 1092 is configured to provision a TEE based on a chain of trust that includes a platform on which the TEE executes in accordance with any one or more of the techniques described herein.

Other possible output devices (not shown) may include piezoelectric or other haptic output devices. Some devices may serve more than one input/output function. For example, touch screen 1032 and display 1054 may be combined in a single input/output device. The input devices 1030 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1012 or applications 1014 may include speech-recognition software as part of a voice control interface that allows a user to operate the mobile device 1000 via voice commands. Furthermore, the mobile device 1000 may include input devices and software that allows for user interaction via a user's spatial gestures, such as detecting and interpreting gestures to provide input to a gaming application.

Wireless modem(s) 1060 may be coupled to antenna(s) (not shown) and may support two-way communications between the processor 1010 and external devices, as is well understood in the art. The modem(s) 1060 are shown generically and may include a cellular modem 1066 for communicating with the mobile communication network 1004 and/or other radio-based modems (e.g., Bluetooth 1064 and/or Wi-Fi 1062). At least one of the wireless modem(s) 1060 is typically configured for communication with one or more cellular networks, such as a GSM network for data and voice communications within a single cellular network, between cellular networks, or between the mobile device and a public switched telephone network (PSTN).

The mobile device may further include at least one input/output port 1080, a power supply 1082, a satellite navigation system receiver 1084, such as a Global Positioning System (GPS) receiver, an accelerometer 1086, and/or a physical connector 1090, which may be a USB port, IEEE 1394 (FireWire) port, and/or RS-232 port. The illustrated components 1002 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of client-side TEE provision logic 110, server-side TEE provision logic 112, platform 204, TEE 206, client-side TEE provision logic 310, server-side TEE provision logic 312, service 314, TEE 316, platform 318, operating system 310, client-side TEE provision logic 410, server-side TEE provision logic 412, service 414, any one or more of TEEs 416A-416P, platform 418, first client-side TEE provision logic 510A, second client-side TEE provision logic 510B, first server-side TEE provision logic 512A, second server-side TEE provision logic 512B, service 514, any one or more of TEEs 516A-516Z, any one or more of TEEs 536A-536Z, activity diagram 200, flowchart 600, and/or flowchart 800 may be implemented in hardware, software, firmware, or any combination thereof.

For example, any one or more of client-side TEE provision logic 110, server-side TEE provision logic 112, platform 204, TEE 206, client-side TEE provision logic 310, server-side TEE provision logic 312, service 314, TEE 316, platform 318, operating system 330, client-side TEE provision logic 410, server-side TEE provision logic 412, service 414, any one or more of TEEs 416A-416P, platform 418, first client-side TEE provision logic 510A, second client-side TEE provision logic 510B, first server-side TEE provision logic 512A, second server-side TEE provision logic 512B, service 514, any one or more of TEEs 516A-516Z, any one or more of TEEs 536A-536Z, activity diagram 200, flowchart 600, and/or flowchart 800 may be implemented, at least in part, as computer program code configured to be executed in one or more processors.

In another example, any one or more of client-side TEE provision logic 110, server-side TEE provision logic 112, platform 204, TEE 206, client-side TEE provision logic 310, server-side TEE provision logic 312, service 314, TEE 316, platform 318, operating system 330, client-side TEE provision logic 410, server-side TEE provision logic 412, service 414, any one or more of TEEs 416A-416P, platform 418, first client-side TEE provision logic 510A, second client-side TEE provision logic 510B, first server-side TEE provision logic 512A, second server-side TEE provision logic 512B, service 514, any one or more of TEEs 516A-516Z, any one or more of TEEs 536A-536Z, activity diagram 200, flowchart 600, and/or flowchart 800 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example client device comprises memory and one or more processors coupled to the memory. The one or more processors are configured to perform operations comprising establish a chain of trust from a trusted execution environment to a platform based at least in part on receipt of measurements of the trusted execution environment that are gathered by the platform and that are signed with a platform signing key of the platform. The measurements indicate attributes of the trusted execution environment, which is hosted by a distributed computing system coupled to the client device. The platform is configured to execute an operating system. The operating system is configured to launch the trusted execution environment from a template. The one or more processors are configured to perform the operations further comprising provision the trusted execution environment with information in absence of a secure channel between the client device and the trusted execution environment to customize the trusted execution environment with the information based at least in part on the chain of trust.

In a first aspect of the example client device, the one or more processors are configured to establish the chain of trust from the trusted execution environment to the platform by using a public key that corresponds to the platform signing key to verify that the measurements are signed with the platform signing key.

In a second aspect of the example client device, the distributed computing system provides a cloud service. In accordance with the second aspect, the one or more processors are configured to perform the operations further comprising use cryptographic communications to exclude entities other than the client device from knowing the information and to exclude the other entities from manipulating the information. The other entities include a provider of the cloud service. The second aspect of the example client device may be implemented in combination with the first aspect of the example client device, though the example embodiments are not limited in this respect.

In a third aspect of the example client device, the one or more processors are configured to perform the operations comprising securely provision the trusted execution environment with the information. The third aspect of the example client device may be implemented in combination with the first and/or second aspect of the example client device, though the example embodiments are not limited in this respect.

In a fourth aspect of the example client device, the one or more processors are configured to perform the operations comprising provision the trusted execution environment with at least one policy in absence of the secure channel between the client device and the trusted execution environment based at least in part on the chain of trust. The fourth aspect of the example client device may be implemented in combination with the first, second, and/or third aspect of the example client device, though the example embodiments are not limited in this respect.

In an implementation of the fourth aspect of the example client device, the one or more processors are configured to perform the operations comprising provide an update regarding the at least one policy to the trusted execution environment. In accordance with this implementation, the update is signed with a policy update key, which corresponds to a public key that is usable by the trusted execution environment to verify that the update is provided by the client device.

In a fifth aspect of the example client device, the one or more processors are configured to perform the operations comprising provision the trusted execution environment with secret information in absence of the secure channel between the client device and the trusted execution environment based at least in part on the chain of trust. The secret information includes at least one of data, software code, or one or more keys. The fifth aspect of the example client device may be implemented in combination with the first, second, third, and/or fourth aspect of the example client device, though the example embodiments are not limited in this respect.

In a first implementation of the fifth aspect of the example client device, the one or more processors are configured to perform the operations comprising encrypt the secret information with a secret import key that is received from the trusted execution environment. The secret import key corresponds to a private key that is usable by the trusted execution environment to decrypt the secret information.

In a second implementation of the fifth aspect of the example client device, the one or more processors are configured to perform the operations comprising provision the trusted execution environment with at least one policy in absence of the secure channel between the client device and the trusted execution environment based at least in part on the chain of trust. In accordance with the second implementation, the one or more processors are configured to perform the operations comprising determine whether to provision the trusted execution environment with the secret information based at least in part on whether the client device receives confirmation from the trusted execution environment that the trusted execution environment has received the at least one policy from the client device. In further accordance with the second implementation, the one or more processors are configured to perform the operations comprising provision the trusted execution environment with the secret information in absence of the secure channel between the client device and the trusted execution environment based at least in part on receipt of the confirmation from the trusted execution environment that the trusted execution environment has received the at least one policy from the client device.

In an example of the second implementation, the confirmation includes the at least one policy.

In a sixth aspect of the example client device, the one or more processors are configured to perform the operations comprising request auditing information from the trusted execution environment. The auditing information indicates a detected state of the trusted execution environment. In accordance with the sixth aspect, the one or more processors are configured to perform the operations comprising determine whether to provision the trusted execution environment with additional information based at least in part on whether the detected state and a reference state are same. In further accordance with the sixth aspect, the one or more processors are configured to perform the operations comprising provision the trusted execution environment with the additional information in absence of the secure channel between the client device and the trusted execution environment to further customize the trusted execution environment with the additional information based at least in part on the detected state and the reference state being the same. The sixth aspect of the example client device may be implemented in combination with the first, second, third, fourth, and/or fifth aspect of the example client device, though the example embodiments are not limited in this respect.

In a seventh aspect of the example client device, the one or more processors are configured to perform the operations comprising encrypt a public portion of a policy update key that is associated with the client device with a public portion of a provisioning encryption key. The policy update key has a private portion that is usable by the client device to sign an update regarding at least one policy that is to be provided to the trusted execution environment. The provisioning encryption key has a private portion that is associated with a plurality of trusted execution environments and that is usable by the trusted execution environment to decrypt the public portion of the policy update key. The plurality of trusted execution environments includes the trusted execution environment. The seventh aspect of the example client device may be implemented in combination with the first, second, third, fourth, fifth, and/or sixth aspect of the example client device, though the example embodiments are not limited in this respect.

An example system comprises memory and one or more processors coupled to the memory. The one or more processors are configured to execute a plurality of trusted execution environments. The plurality of trusted execution environments includes at least a first trusted execution environment and a second trusted execution environment. The first trusted execution environment is configured to perform operations comprising establish a chain of trust from the second trusted execution environment to a platform based at least in part on receipt of measurements of the second trusted execution environment that are gathered by the platform and that are signed with a platform signing key of the platform. The measurements indicate attributes of the second trusted execution environment, which is hosted by a distributed computing system that hosts the first trusted execution environment. The platform is configured to execute an operating system. The operating system is configured to launch the second trusted execution environment from a template. The first trusted execution environment is configured to perform the operations further comprising provision the second trusted execution environment with information in absence of a secure channel between the first trusted execution environment and the second trusted execution environment to customize the second trusted execution environment with the information based at least in part on the chain of trust.

In a first aspect of the example system, the first trusted execution environment is configured to perform the operations comprising establish the chain of trust from the second trusted execution environment to the platform further based at least in part on receipt of a notice from the second trusted execution environment. The notice informs the first trusted execution environment of existence of the second trusted execution environment.

In a second aspect of the example system, the first trusted execution environment is configured to perform the operations comprising establish the chain of trust and provision the second trusted execution environment in accordance with a consensus algorithm that is configured to provide redundancy of the first trusted execution environment. In accordance with the second aspect, the information includes policies and secret information, which are copied from the first trusted execution environment. The second aspect of the example system may be implemented in combination with the first aspect of the example system, though the example embodiments are not limited in this respect.

In an implementation of the second aspect of the example system, the distributed computing system provides a cloud service. In accordance with this implementation, the first trusted execution environment is configured to perform the operations comprising establish the chain of trust from the second trusted execution environment to the platform in response to the cloud service instructing the operating system to launch the second trusted execution environment in accordance with the consensus algorithm.

In a third aspect of the example system, the first trusted execution environment is configured to establish the chain of trust from the second trusted execution environment to the platform by using a public key that corresponds to the platform signing key to verify that the measurements are signed with the platform signing key. The third aspect of the example system may be implemented in combination with the first and/or second aspect of the example system, though the example embodiments are not limited in this respect.

In a fourth aspect of the example system, the distributed computing system provides a cloud service. In accordance with the fourth aspect, the first trusted execution environment is configured to perform the operations further comprising use cryptographic communications to exclude entities other than the first trusted execution environment from knowing the information and to exclude the other entities from manipulating the information, the other entities including a provider of the cloud service. The fourth aspect of the example system may be implemented in combination with the first, second, and/or third aspect of the example system, though the example embodiments are not limited in this respect.

In a fifth aspect of the example system, the first trusted execution environment is configured to perform the operations comprising securely provision the second trusted execution environment with the information. The fifth aspect of the example system may be implemented in combination with the first, second, third, and/or fourth aspect of the example system, though the example embodiments are not limited in this respect.

In a sixth aspect of the example system, the first trusted execution environment is configured to perform the operations comprising provision the second trusted execution environment with at least one policy in absence of the secure channel between the first trusted execution environment and the second trusted execution environment based at least in part on the chain of trust. The sixth aspect of the example system may be implemented in combination with the first, second, third, fourth, and/or fifth aspect of the example system, though the example embodiments are not limited in this respect.

In an implementation of the sixth aspect of the example system, the first trusted execution environment is configured to perform the operations comprising provide an update regarding the at least one policy to the second trusted execution environment. In accordance with this implementation, the update is signed with a policy update key, which corresponds to a public key that is usable by the second trusted execution environment to verify that the update is provided by the first trusted execution environment.

In a seventh aspect of the example system, the first trusted execution environment is configured to perform the operations comprising provision the second trusted execution environment with secret information in absence of the secure channel between the first trusted execution environment and the second trusted execution environment based at least in part on the chain of trust. The secret information includes at least one of data, software code, or one or more keys. The seventh aspect of the example system may be implemented in combination with the first, second, third, fourth, fifth, and/or sixth aspect of the example system, though the example embodiments are not limited in this respect.

In a first implementation of the seventh aspect of the example system, the first trusted execution environment is configured to perform the operations comprising encrypt the secret information with a secret import key that is received from the second trusted execution environment. The secret import key corresponds to a private key that is usable by the second trusted execution environment to decrypt the secret information.

In a second implementation of the seventh aspect of the example system, the first trusted execution environment is configured to perform the operations comprising provision the second trusted execution environment with at least one policy in absence of the secure channel between the first trusted execution environment and the second trusted execution environment based at least in part on the chain of trust. In accordance with the second implementation, the first trusted execution environment is configured to perform the operations comprising determine whether to provision the second trusted execution environment with the secret information based at least in part on whether the first trusted execution environment receives confirmation from the second trusted execution environment that the second trusted execution environment has received the at least one policy from the first trusted execution environment. In further accordance with the second implementation, the first trusted execution environment is configured to perform the operations comprising provision the second trusted execution environment with the secret information in absence of the secure channel between the first trusted execution environment and the second trusted execution environment based at least in part on receipt of the confirmation from the second trusted execution environment that the second trusted execution environment has received the at least one policy from the first trusted execution environment.

In an example of the second implementation, the confirmation includes the at least one policy.

In an eighth aspect of the example system, the first trusted execution environment is configured to perform the operations comprising request auditing information from the second trusted execution environment. The auditing information indicates a detected state of the second trusted execution environment. In accordance with the eighth aspect, the first trusted execution environment is configured to perform the operations comprising determine whether to provision the second trusted execution environment with additional information based at least in part on whether the detected state and a reference state are same. In further accordance with the eighth aspect, the first trusted execution environment is configured to perform the operations comprising provision the second trusted execution environment with the additional information in absence of the secure channel between the first trusted execution environment and the second trusted execution environment to further customize the second trusted execution environment with the additional information based at least in part on the detected state and the reference state being the same. The eighth aspect of the example system may be implemented in combination with the first, second, third, fourth, fifth, sixth, and/or seventh aspect of the example system, though the example embodiments are not limited in this respect.

In a ninth aspect of the example system, the first trusted execution environment is configured to perform the operations comprising collaborate with other trusted execution environments in a plurality of trusted execution environments to have a provisioning encryption key propagated to each of the plurality of trusted execution environments in accordance with a consensus algorithm. The plurality of trusted execution environments includes the first and second trusted execution environments. In accordance with the ninth aspect, the first trusted execution environment is configured to perform the operations comprising encrypt the information with a public portion of the provisioning encryption key. In further accordance with the ninth aspect, the first trusted execution environment is configured to perform the operations comprising provision the second trusted execution environment with the information in response to encrypting the information with the public portion of the provisioning encryption key. The ninth aspect of the example system may be implemented in combination with the first, second, third, fourth, fifth, sixth, seventh, and/or eighth aspect of the example system, though the example embodiments are not limited in this respect.

In an implementation of the ninth aspect of the example system, the first trusted execution environment is configured to perform the operations comprising collaborate with the other trusted execution environments by encrypting the provisioning encryption key, for each of the other trusted execution environments that is to receive the provisioning encryption key from the first trusted execution environment, with a public portion of a secret import key associated with the respective trusted execution environment.

In a first example method performed using at least one processor of a client device, a chain of trust from a trusted execution environment to a platform is established based at least in part on receipt of measurements of the trusted execution environment that are gathered by the platform and that are signed with a platform signing key of the platform. The measurements indicate attributes of the trusted execution environment, which is hosted by a distributed computing system coupled to the client device. The platform is configured to execute an operating system. The operating system is configured to launch the trusted execution environment from a template. The trusted execution environment is provisioned with information in absence of a secure channel between the client device and the trusted execution environment to customize the trusted execution environment with the information based at least in part on the chain of trust.

In a first aspect of the first example method, establishing the chain of trust comprises using a public key that corresponds to the platform signing key to verify that the measurements are signed with the platform signing key.

In a second aspect of the first example method, the distributed computing system provides a cloud service. In accordance with the second aspect; the first example method further comprises using cryptographic communications to exclude entities other than the client device from knowing the information and to exclude the other entities from manipulating the information, the other entities including a provider of the cloud service. The second aspect of the first example method may be implemented in combination with the first aspect of the first example method, though the example embodiments are not limited in this respect.

In a third aspect of the first example method, provisioning the trusted execution environment comprises securely provisioning the trusted execution environment with the information. The third aspect of the first example method may be implemented in combination with the first and/or second aspect of the first example method, though the example embodiments are not limited in this respect.

In a fourth aspect of the first example method, provisioning the trusted execution environment comprises provisioning the trusted execution environment with at least one policy in absence of the secure channel between the client device and the trusted execution environment based at least in part on the chain of trust. The fourth aspect of the first example method may be implemented in combination with the first, second, and/or third aspect of the first example method, though the example embodiments are not limited in this respect.

In an implementation of the fourth aspect of the first example method, the first example method further comprises providing an update regarding the at least one policy to the trusted execution environment. In accordance with this implementation, the update is signed with a policy update key, which corresponds to a public key that is usable by the trusted execution environment to verify that the update is provided by the client device.

In a fifth aspect of the first example method, provisioning the trusted execution environment comprises provisioning the trusted execution environment with secret information in absence of the secure channel between the client device and the trusted execution environment based at least in part on the chain of trust. The secret information includes at least one of data, software code, or one or more keys. The fifth aspect of the first example method may be implemented in combination with the first, second, third, and/or fourth aspect of the first example method, though the example embodiments are not limited in this respect.

In a first implementation of the fifth aspect of the first example method, the first example method further comprises encrypting the secret information with a secret import key that is received from the trusted execution environment, the secret import key corresponding to a private key that is usable by the trusted execution environment to decrypt the secret information.

In a second implementation of the fifth aspect of the first example method, provisioning the trusted execution environment comprises provisioning the trusted execution environment with at least one policy in absence of the secure channel between the client device and the trusted execution environment based at least in part on the chain of trust. In accordance with the second implementation, the first example method further comprises determining whether to provision the trusted execution environment with the secret information based at least in part on whether the client device receives confirmation from the trusted execution environment that the trusted execution environment has received the at least one policy from the client device. In further accordance with the second implementation, provisioning the trusted execution environment comprises provisioning the trusted execution environment with the secret information in absence of the secure channel between the client device and the trusted execution environment based at least in part on receipt of the confirmation from the trusted execution environment that the trusted execution environment has received the at least one policy from the client device.

In an example of the second implementation, the confirmation includes the at least one policy.

In a sixth aspect of the first example method, the first example method further comprises requesting auditing information from the trusted execution environment. The auditing information indicates a detected state of the trusted execution environment. In accordance with the sixth aspect, the first example method further comprises determining whether to provision the trusted execution environment with additional information based at least in part on whether the detected state and a reference state are same. In further accordance with the sixth aspect, the first example method further comprises provisioning the trusted execution environment with the additional information in absence of the secure channel between the client device and the trusted execution environment to further customize the trusted execution environment with the additional information based at least in part on the detected state and the reference state being the same. The sixth aspect of the first example method may be implemented in combination with the first, second, third, fourth, and/or fifth aspect of the first example method, though the example embodiments are not limited in this respect.

In a seventh aspect of the first example method, the first example method further comprises encrypting a public portion of a policy update key that is associated with the client device with a public portion of a provisioning encryption key. The policy update key has a private portion that is usable by the client device to sign an update regarding at least one policy that is to be provided to the trusted execution environment. The provisioning encryption key has a private portion that is associated with a plurality of trusted execution environments and that is usable by the trusted execution environment to decrypt the public portion of the policy update key. The plurality of trusted execution environments includes the trusted execution environment. The seventh aspect of the first example method may be implemented in combination with the first, second, third, fourth, fifth, and/or sixth aspect of the first example method, though the example embodiments are not limited in this respect.

In a second example method performed by a first trusted execution environment using one or more processors of a processor-based system, a chain of trust from a second trusted execution environment to a platform is established based at least in part on receipt of measurements of the second trusted execution environment that are gathered by the platform and that are signed with a platform signing key of the platform. The measurements indicate attributes of the second trusted execution environment, which is hosted by a distributed computing system that hosts the first trusted execution environment. The platform is configured to execute an operating system. The operating system is configured to launch the second trusted execution environment from a template. The second trusted execution environment is provisioned with information in absence of a secure channel between the first trusted execution environment and the second trusted execution environment to customize the second trusted execution environment with the information based at least in part on the chain of trust.

In a first aspect of the second example method, establishing the chain of trust comprises establishing the chain of trust from the second trusted execution environment to the platform further based at least in part on receipt of a notice from the second trusted execution environment, the notice informing the first trusted execution environment of existence of the second trusted execution environment.

In a second aspect of the second example method, establishing the chain of trust comprises establishing the chain of trust in accordance with a consensus algorithm that is configured to provide redundancy of the first trusted execution environment. In accordance with the second aspect, provisioning the second trusted execution environment comprises provisioning the second trusted execution environment in accordance with the consensus algorithm. In further accordance with the second aspect, the information includes policies and secret information, which are copied from the first trusted execution environment. The second aspect of the second example method may be implemented in combination with the first aspect of the second example method, though the example embodiments are not limited in this respect.

In an implementation of the second aspect of the second example method, establishing the chain of trust comprises establishing the chain of trust from the second trusted execution environment to the platform in response to a cloud service that is provided by the distributed computing system instructing the operating system to launch the second trusted execution environment in accordance with the consensus algorithm.

In a third aspect of the second example method, establishing the chain of trust comprises using a public key that corresponds to the platform signing key to verify that the measurements are signed with the platform signing key. The third aspect of the second example method may be implemented in combination with the first and/or second aspect of the second example method, though the example embodiments are not limited in this respect.

In a fourth aspect of the second example method, the second example method comprises using cryptographic communications to exclude entities other than the first trusted execution environment from knowing the information and to exclude the other entities from manipulating the information, the other entities including a provider of a cloud service that is hosted by the distributed computing system. The fourth aspect of the second example method may be implemented in combination with the first, second, and/or third aspect of the second example method, though the example embodiments are not limited in this respect.

In a fifth aspect of the second example method, provisioning the second trusted execution environment comprises securely provisioning the second trusted execution environment with the information. The fifth aspect of the second example method may be implemented in combination with the first, second, third, and/or fourth aspect of the second example method, though the example embodiments are not limited in this respect.

In a sixth aspect of the second example method, provisioning the second trusted execution environment comprises provisioning the second trusted execution environment with at least one policy in absence of the secure channel between the first trusted execution environment and the second trusted execution environment based at least in part on the chain of trust. The sixth aspect of the second example method may be implemented in combination with the first, second, third, fourth, and/or fifth aspect of the second example method, though the example embodiments are not limited in this respect.

In an implementation of the sixth aspect of the second example method, the second example method further comprises providing an update regarding the at least one policy to the second trusted execution environment. In accordance with this implementation, the update is signed with a policy update key, which corresponds to a public key that is usable by the second trusted execution environment to verify that the update is provided by the first trusted execution environment.

In a seventh aspect of the second example method, provisioning the second trusted execution environment comprises provisioning the second trusted execution environment with secret information in absence of the secure channel between the first trusted execution environment and the second trusted execution environment based at least in part on the chain of trust, the secret information including at least one of data, software code, or one or more keys. The seventh aspect of the second example method may be implemented in combination with the first, second, third, fourth, fifth, and/or sixth aspect of the second example method, though the example embodiments are not limited in this respect.

In a first implementation of the seventh aspect of the second example method, the second example method further comprises encrypting the secret information with a secret import key that is received from the second trusted execution environment, the secret import key corresponding to a private key that is usable by the second trusted execution environment to decrypt the secret information.

In a second implementation of the seventh aspect of the second example method, provisioning the second trusted execution environment comprises provisioning the second trusted execution environment with at least one policy in absence of the secure channel between the first trusted execution environment and the second trusted execution environment based at least in part on the chain of trust. In accordance with the second implementation, the second example method further comprises determining whether to provision the second trusted execution environment with the secret information based at least in part on whether the first trusted execution environment receives confirmation from the second trusted execution environment that the second trusted execution environment has received the at least one policy from the first trusted execution environment. In further accordance with the second implementation, provisioning the second trusted execution environment comprises provisioning the second trusted execution environment with the secret information in absence of the secure channel between the first trusted execution environment and the second trusted execution environment based at least in part on receipt of the confirmation from the second trusted execution environment that the second trusted execution environment has received the at least one policy from the first trusted execution environment.

In an example of the second implementation, the confirmation includes the at least one policy.

In an eighth aspect of the second example method, the second example method comprises requesting auditing information from the second trusted execution environment, the auditing information indicating a detected state of the second trusted execution environment. In accordance with the eighth aspect, the second example method comprises determining whether to provision the second trusted execution environment with additional information based at least in part on whether the detected state and a reference state are same. In further accordance with the eighth aspect, the second example method comprises provisioning the second trusted execution environment with the additional information in absence of the secure channel between the first trusted execution environment and the second trusted execution environment to further customize the second trusted execution environment with the additional information based at least in part on the detected state and the reference state being the same. The eighth aspect of the second example method may be implemented in combination with the first, second, third, fourth, fifth, sixth, and/or seventh aspect of the second example method, though the example embodiments are not limited in this respect.

In a ninth aspect of the second example method, the second example method comprises collaborating with other trusted execution environments in a plurality of trusted execution environments to have a provisioning encryption key propagated to each of the plurality of trusted execution environments in accordance with a consensus algorithm. The plurality of trusted execution environments includes the first and second trusted execution environments. In accordance with the ninth aspect, the second example method comprises encrypting the information with a public portion of the provisioning encryption key. In further accordance with the ninth aspect, the second example method comprises provisioning the second trusted execution environment with the information in response to encrypting the information with the public portion of the provisioning encryption key. The ninth aspect of the second example method may be implemented in combination with the first, second, third, fourth, fifth, sixth, seventh, and/or eighth aspect of the second example method, though the example embodiments are not limited in this respect.

In an implementation of the ninth aspect of the second example method, the second example method comprises collaborating with the other trusted execution environments by encrypting the provisioning encryption key, for each of the other trusted execution environments that is to receive the provisioning encryption key from the first trusted execution environment, with a public portion of a secret import key associated with the respective trusted execution environment.

A first example computer program product comprises a computer-readable storage medium having instructions recorded thereon for enabling a processor-based system to perform steps. The steps comprise establish a chain of trust from a trusted execution environment to a platform based at least in part on receipt of measurements of the trusted execution environment that are gathered by the platform and that are signed with a platform signing key of the platform. The measurements indicate attributes of the trusted execution environment, which is hosted by a distributed computing system coupled to the processor-based system. The platform is configured to execute an operating system. The operating system is configured to launch the trusted execution environment from a template. The steps further comprise provision the trusted execution environment with information in absence of a secure channel between the processor-based system and the trusted execution environment to customize the trusted execution environment with the information based at least in part on the chain of trust.

A second example computer program product comprises a computer-readable storage medium having instructions recorded thereon for enabling a processor-based system to perform steps. The steps comprise establish, by a first trusted execution environment, a chain of trust from a second trusted execution environment to a platform based at least in part on receipt of measurements of the second trusted execution environment that are gathered by the platform and that are signed with a platform signing key of the platform. The measurements indicate attributes of the second trusted execution environment, which is hosted by a distributed computing system that hosts the first trusted execution environment. The platform is configured to execute an operating system. The operating system is configured to launch the second trusted execution environment from a template. The steps further comprise provision, by the first trusted execution environment, the second trusted execution environment with information in absence of a secure channel between the first trusted execution environment and the second trusted execution environment to customize the second trusted execution environment with the information based at least in part on the chain of trust.

IV. Example Computer System

Figure 11:
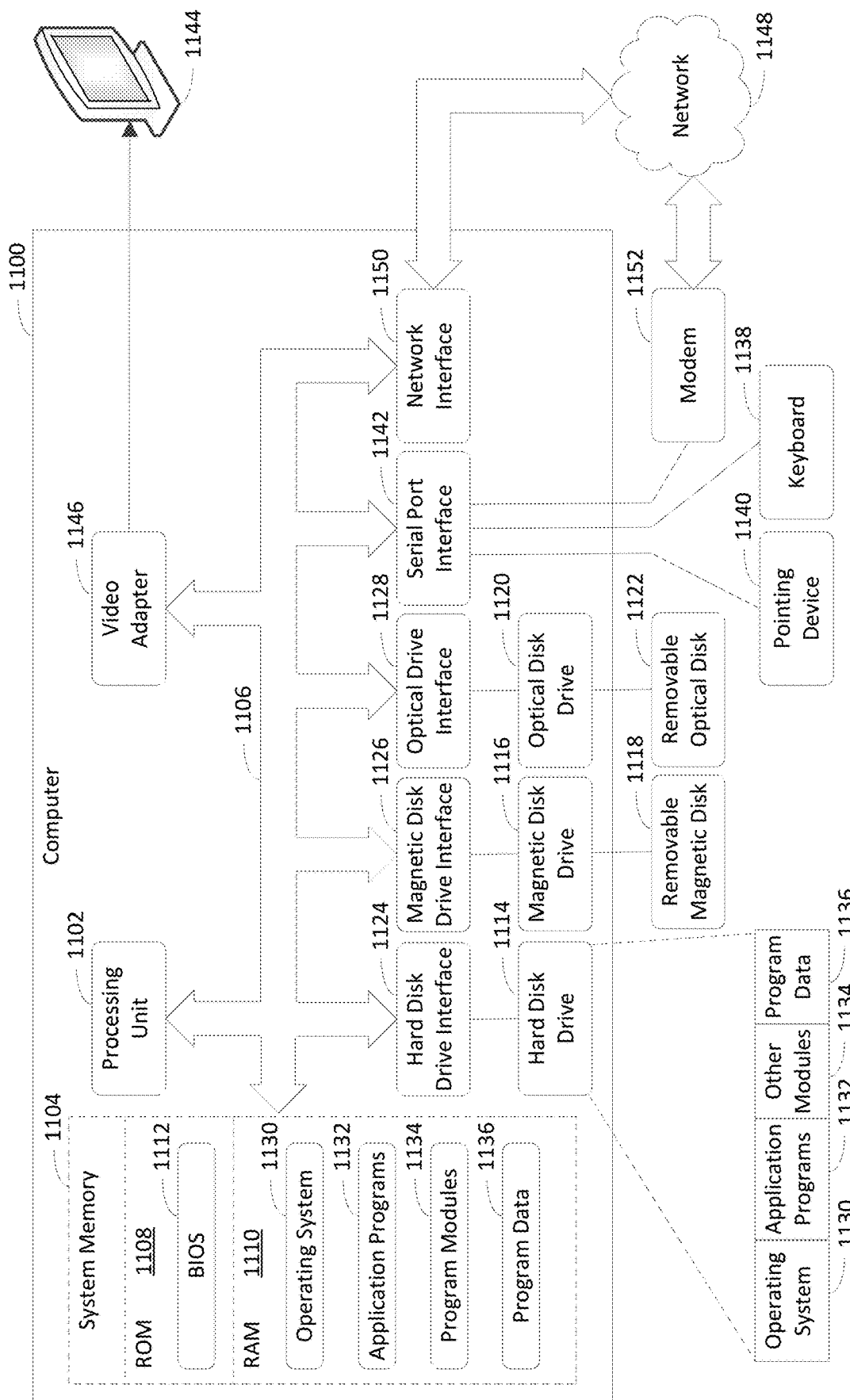
FIG. 11 depicts an example computer in which embodiments may be implemented.

FIG. 11 depicts an example computer 1100 in which embodiments may be implemented. Any one or more of user systems 102A-102M and/or any one or more of servers 106A-106N shown in FIG. 1; client device 202 shown in FIG. 2; client device 302 shown in FIG. 3; client device 402 shown in FIG. 4; first client device 502A, second client device 502B, and/or any one or more of computers 528A-528Z shown in FIG. 5; and/or client device 700 shown in FIG. 7 may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processing unit 1102, a system memory 1104, and a bus 1106 that couples various system components including system memory 1104 to processing unit 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing any one or more of (e.g., at least a portion of) client-side TEE provision logic 110, server-side TEE provision logic 112, platform 204, TEE 206, client-side TEE provision logic 310, server-side TEE provision logic 312, service 314, TEE 316, platform 318, operating system 330, client-side TEE provision logic 410, server-side TEE provision logic 412, service 414, any one or more of TEEs 416A-416P, platform 418, first client-side TEE provision logic 510A, second client-side TEE provision logic 510B, first server-side TEE provision logic 512A, second server-side TEE provision logic 512B, service 514, any one or more of TEEs 516A-516Z, any one or more of TEEs 536A-536Z, activity diagram 200 (including any activity of activity diagram 200), flowchart 600 (including any step of flowchart 600), and/or flowchart 800 (including any step of flowchart 800), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processing unit 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable storage medium" are used to generally refer to media (e.g., non-transitory media) such as the hard disk associated with hard disk drive 1114, removable magnetic disk 1118, removable optical disk 1122, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A client device comprising:
   memory; and
   a processing system coupled to the memory, the processing system configured to perform operations comprising:
   provide a template or an indication that a user associated with the client device selects the template to a distributed computing system that is coupled to the client device, wherein the template includes no secrets of the user;
   establish a chain of trust from a trusted execution environment to a platform based at least in part on receipt of measurements of the trusted execution environment, which are signed with a platform signing key of the platform, from the platform,
   the measurements indicating attributes of the trusted execution environment, which is hosted by the distributed computing system;
   determine whether to provision the trusted execution environment with secret information based at least in part on whether the client device receives confirmation from the trusted execution environment that the trusted execution environment has received a policy from the client device, the confirmation indicating the policy; and
   provision the trusted execution environment with the secret information in absence of a secure channel between the client device and the trusted execution environment to customize the trusted execution environment with the secret information based at least in part on receipt of the confirmation, which indicates the policy and which confirms that the trusted execution environment has received the policy from the client device, from the trusted execution environment and further based at least in part on the chain of trust in response to the trusted execution environment being launched from the template, which is associated with an operating system that is associated with the platform.

2. The client device of claim 1, wherein the processing system is configured to establish the chain of trust from the trusted execution environment to the platform by using a public key that corresponds to the platform signing key to verify that the measurements are signed with the platform signing key.

3. The client device of claim 1, wherein the processing system is configured to perform the operations comprising:
   provide an update regarding the policy to the trusted execution environment; and
   wherein the update is signed with a policy update key, which corresponds to a public key that is usable by the trusted execution environment to verify that the update is provided by the client device.

4. The client device of claim 1, wherein the processing system is configured to perform the operations comprising:
   provision the trusted execution environment with secret information in absence of the secure channel between the client device and the trusted execution environment based at least in part on the chain of trust, the secret information including at least one of data or software code.

5. The client device of claim 4, wherein the processing system is configured to perform the operations comprising:
   encrypt the secret information with a secret import key that is received from the trusted execution environment, the secret import key corresponding to a private key that is usable by the trusted execution environment to decrypt the secret information.

6. The client device of claim 1, wherein the confirmation includes the policy; and
   wherein the processing system is configured to perform the operations comprising:
   provision the trusted execution environment with the secret information in absence of the secure channel between the client device and the trusted execution environment to customize the trusted execution environment with the secret information based at least in part on receipt of the confirmation, which includes the policy and which confirms that the trusted execution environment has received the policy from the client device, from the trusted execution environment and further based at least in part on the chain of trust in response to the trusted execution environment being launched from the template, which is associated with the operating system that is associated with the platform.

7. The client device of claim 1, wherein the processing system is configured to perform the operations comprising:
   request auditing information from the trusted execution environment, the auditing information indicating a detected state of the trusted execution environment;
   determine whether to provision the trusted execution environment with additional information based at least in part on whether the detected state and a reference state are same; and
   provision the trusted execution environment with the additional information in absence of the secure channel between the client device and the trusted execution environment to further customize the trusted execution environment with the additional information based at least in part on the detected state and the reference state being the same.

8. The client device of claim 1, wherein the processing system is configured to perform the operations further comprising:
   encrypt a public portion of a policy update key that is associated with the client device with a public portion of a provisioning encryption key, the policy update key having a private portion that is usable by the client device to sign an update regarding policy that is to be provided to the trusted execution environment, the provisioning encryption key having a private portion that is associated with a plurality of trusted execution environments and that is usable by the trusted execution environment to decrypt the public portion of the policy update key, the plurality of trusted execution environments including the trusted execution environment.

9. The client device of claim 1, wherein the policy includes a requirement that a specified condition is satisfied in order for a signature to be applied to information.

10. The client device of claim 1, wherein the policy includes a requirement that a specified condition is satisfied in order for a signature to be applied to information of a designated type.

11. The client device of claim 1, wherein the policy includes a requirement that a specified procedure is to be followed in order to update rules.

12. The client device of claim 11, wherein the policy includes a requirement that a designated signing key is to be used to sign the rules.

13. The client device of claim 1, wherein the processing system is configured to perform the operations comprising:
provide the template from the client device to the distributed computing system that is coupled to the client device.

14. A method performed using a processing system of a client device, the method comprising:
providing a template or an indication that a user associated with the client device selects the template to a distributed computing system that is coupled to the client device, wherein the template has not been customized with regard to the client device and has not been customized with regard to the user;
establishing a chain of trust from a trusted execution environment to a platform based at least in part on receipt of measurements of the trusted execution environment, which are signed with a platform signing key of the platform, from the platform,
the measurements indicating attributes of the trusted execution environment, which is hosted by the distributed computing system;
encrypting a public portion of a policy update key that is associated with the client device with a public portion of a provisioning encryption key, the policy update key having a private portion that is usable by the client device to sign an update regarding a policy that is to be provided to the trusted execution environment, the provisioning encryption key having a private portion that is associated with a plurality of trusted execution environments and that is usable by the trusted execution environment to decrypt the public portion of the policy update key, the plurality of trusted execution environments including the trusted execution environment; and
provisioning the trusted execution environment with the policy in absence of a secure channel between the client device and the trusted execution environment to customize the trusted execution environment with the policy based at least in part on the chain of trust in response to the trusted execution environment being launched from the template, which is associated with an operating system that is associated with the platform.

15. The method of claim 14, wherein the distributed computing system provides a cloud service; and
wherein the method further comprises:
using cryptographic communications to exclude entities other than the client device from knowing the information and to exclude the other entities from manipulating the information, the other entities including a provider of the cloud service.

16. The method of claim 14, wherein provisioning the trusted execution environment comprises:
securely provisioning the trusted execution environment with the information.

17. The method of claim 14, further comprising:
providing an update regarding the policy to the trusted execution environment;
wherein the update is signed with a policy update key, which corresponds to a public key that is usable by the trusted execution environment to verify that the update is provided by the client device.

18. The method of claim 14, wherein provisioning the trusted execution environment comprises:
provisioning the trusted execution environment with secret information in absence of the secure channel between the client device and the trusted execution environment based at least in part on the chain of trust, the secret information including at least one of data or software code.

19. The method of claim 18, further comprising:
encrypting the secret information with a secret import key that is received from the trusted execution environment, the secret import key corresponding to a private key that is usable by the trusted execution environment to decrypt the secret information.

20. The method of claim 18, further comprising:
determining whether to provision the trusted execution environment with the secret information based at least in part on whether the client device receives confirmation from the trusted execution environment that the trusted execution environment has received the policy from the client device; and
wherein provisioning the trusted execution environment comprises:
provisioning the trusted execution environment with the secret information in absence of the secure channel between the client device and the trusted execution environment based at least in part on receipt of the confirmation from the trusted execution environment that the trusted execution environment has received the policy from the client device.

21. The method of claim 20, wherein the confirmation includes the policy.

22. The method of claim 14, wherein the platform is a central processing unit.

23. A computer program product comprising a computer-readable device having instructions recorded thereon for enabling a processor-based system to perform steps, the steps comprising:
provide a template or an indication that a user associated with the client device selects the template to a distributed computing system that is coupled to the processor-based system, wherein the template includes no information that is specific to the user;
based at least in part on receipt of measurements of a trusted execution environment, which are signed with a platform signing key of a central processing unit (CPU), from the CPU, establish a chain of trust from the trusted execution environment to the CPU by using a public key that corresponds to the platform signing key to verify that the measurements are signed with the platform signing key,
the measurements indicating attributes of the trusted execution environment,
which is hosted by the distributed computing system; and
provision the trusted execution environment with secret information, including at least one of data or software code, in absence of a secure channel between the processor-based system and the trusted execution environment to customize the trusted execution environment with the information based at least in part on the chain of trust in response to the trusted execution environment being launched from the template, which is associated with an operating system that is associated with the CPU.

24. The computer program product of claim 23, wherein the steps comprise:
provision the trusted execution environment with a policy in absence of the secure channel between the processor-based system and the trusted execution environment based at least in part on the chain of trust.

25. The computer program product of claim 23, wherein the steps comprise:
provision the trusted execution environment with the data in absence of the secure channel between the processor-based system and the trusted execution environment.

26. The computer program product of claim 23, wherein the steps comprise:
provision the trusted execution environment with the software code in absence of the secure channel between the processor-based system and the trusted execution environment.

27. A client device comprising:
means for providing a template from the client device to a distributed computing system that is coupled to the client device, wherein the template includes no secrets of the user;
means for establishing a chain of trust from a trusted execution environment to a platform based at least in part on receipt of measurements of the trusted execution environment, which are signed with a platform signing key of the platform, from the platform,
the measurements indicating attributes of the trusted execution environment, which is hosted by the distributed computing system; and
means for provisioning the trusted execution environment with secret information, including at least one of data or software code, in absence of a secure channel between the client device and the trusted execution environment to customize the trusted execution environment with the information based at least in part on the chain of trust in response to the trusted execution environment being launched from the template, which is associated with an operating system that is associated with the platform.

28. The client device of claim 27, wherein the distributed computing system provides a cloud service; and
wherein the client device further comprises:
means for using cryptographic communications to exclude entities other than the client device from knowing the information and to exclude the other entities from manipulating the information, the other entities including a provider of the cloud service.

* * * * *